(12) United States Patent
Masuda

(10) Patent No.: US 12,071,113 B2
(45) Date of Patent: Aug. 27, 2024

(54) ELECTRIC-POWERED ACTUATOR AND ELECTRIC BRAKING DEVICE

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 413 days.

(21) Appl. No.: 17/480,627

(22) Filed: Sep. 21, 2021

(65) Prior Publication Data

US 2022/0001847 A1 Jan. 6, 2022

Related U.S. Application Data

(63) Continuation of application No. PCT/JP2020/012272, filed on Mar. 19, 2020.

(30) Foreign Application Priority Data

Mar. 28, 2019 (JP) .................................. 2019-062114

(51) Int. Cl.
*B60T 13/74* (2006.01)
*B60T 1/06* (2006.01)
(Continued)

(52) U.S. Cl.
CPC ............ *B60T 13/746* (2013.01); *B60T 1/065* (2013.01); *B60T 8/17* (2013.01); *F16D 55/02* (2013.01);
(Continued)

(58) Field of Classification Search
CPC ........ F16D 55/02; F16D 65/18; F16D 65/005; F16D 2121/24; F16D 2127/06;
(Continued)

(56) References Cited

U.S. PATENT DOCUMENTS 7,810,616 B2 10/2010 Nakazeki
7,828,124 B2 11/2010 Sano et al.
(Continued)

FOREIGN PATENT DOCUMENTS

CN 1469530 A 1/2004
CN 101592199 A 12/2009
(Continued)

OTHER PUBLICATIONS

International Search Report for International Patent Application No. PCT/JP2020/012272 filed Mar. 19, 2020.
(Continued)

*Primary Examiner* — Thomas J Williams

(57) ABSTRACT

The electric-powered actuator includes a control device including: a motor angle estimation unit, and a reverse-input holding control section having a function of engaging an engaging part with an engaged part by controlling a solenoid to set the reverse-input holding mechanism into a reverse-input holding state while the electric-powered actuator is applying a load and a function of, from the reverse-input holding state, disengaging the engaging part from the engaged part to set the reverse-input holding mechanism into a reverse-input holding release state. The reverse-input holding control section includes an engagement intermediate control function section configured to control the estimated rotation angle such that the engaged part and the engaging part come into a predetermined positional relation within a certain period of time, when the engaging part is brought into engagement with the engaged part and when the engaging part is brought out of engagement with the engaged part.

6 Claims, 17 Drawing Sheets

(51) Int. Cl.
*B60T 8/17* (2006.01)
*F16D 55/02* (2006.01)
*F16D 65/00* (2006.01)
*F16D 65/18* (2006.01)
*H02P 3/02* (2006.01)
*F16D 121/24* (2012.01)
*F16D 127/06* (2012.01)

(52) U.S. Cl.
CPC .......... *F16D 65/005* (2013.01); *F16D 65/18* (2013.01); *H02P 3/025* (2013.01); *F16D 2121/24* (2013.01); *F16D 2127/06* (2013.01)

(58) Field of Classification Search
CPC ........ B60T 13/746; B60T 13/74; B60T 1/065; B60T 8/17
See application file for complete search history.

(56) References Cited

U.S. PATENT DOCUMENTS

| | | |
|---|---|---|
| 8,205,725 B2 | 6/2012 | Sakashita |
| 9,333,953 B2 | 5/2016 | Masuda et al. |
| 9,341,222 B2 | 5/2016 | Masuda et al. |
| 9,566,970 B2 | 2/2017 | Richard et al. |
| 9,970,499 B2 | 5/2018 | Yamasaki et al. |
| 10,343,667 B2 | 7/2019 | Tsukamoto |
| 10,352,383 B2 | 7/2019 | Masuda et al. |
| 10,391,985 B2 | 8/2019 | Misumi et al. |
| 10,634,202 B2 | 4/2020 | Saoyama |
| 2008/0110704 A1 | 5/2008 | Nakazeki |
| 2009/0294224 A1 | 12/2009 | Sakashita |
| 2010/0051395 A1 | 3/2010 | Sano et al. |
| 2014/0262641 A1 | 9/2014 | Richard et al. |
| 2015/0041261 A1 | 2/2015 | Masuda et al. |
| 2015/0219172 A1* | 8/2015 | Saoyama ................ F16D 65/54 188/162 |
| 2015/0246662 A1 | 9/2015 | Masuda et al. |
| 2015/0330466 A1 | 11/2015 | Masuda et al. |
| 2016/0131212 A1 | 5/2016 | Yamasaki et al. |
| 2017/0108067 A1 | 4/2017 | Masuda et al. |
| 2018/0017115 A1 | 1/2018 | Saoyama |
| 2018/0148022 A1 | 5/2018 | Misumi et al. |
| 2018/0215369 A1 | 8/2018 | Tsukamoto |
| 2019/0003536 A1* | 1/2019 | Yasui ..................... B60T 7/042 |
| 2022/0001847 A1* | 1/2022 | Masuda ................... B60T 8/00 |
| 2022/0105919 A1* | 4/2022 | Masuda ................. B60T 7/107 |

FOREIGN PATENT DOCUMENTS

| | | |
|---|---|---|
| CN | 101660580 A | 3/2010 |
| CN | 104044732 A | 9/2014 |
| CN | 104169145 A | 11/2014 |
| CN | 104703849 A | 6/2015 |
| CN | 104822961 A | 8/2015 |
| CN | 105324588 A | 2/2016 |
| CN | 106536300 A | 3/2017 |
| CN | 107250594 A | 10/2017 |
| CN | 108146417 A | 6/2018 |
| DE | 11 2016 000 900 B4 | 3/2023 |
| JP | 2006-183809 A | 7/2006 |
| JP | 2006-194356 A | 7/2006 |
| JP | 2018-86868 A | 6/2018 |
| KR | 10-2015-0025067 | 3/2015 |
| WO | WO 2016/114235 A1 | 7/2016 |

OTHER PUBLICATIONS

Chinese Office Action dated Oct. 28, 2022 in Chinese Patent Application No. 202080025252.3 (9 pages; 7 pages English translation).

Japanese Office Action dated Nov. 15, 2022 in Japanese Patent Application No. 2019-062114 (4 pages).

International Preliminary Report on Patentability and Written Opinion for International Patent Application No. PCT/JP2020/012272 dated Oct. 7, 2021.

* cited by examiner

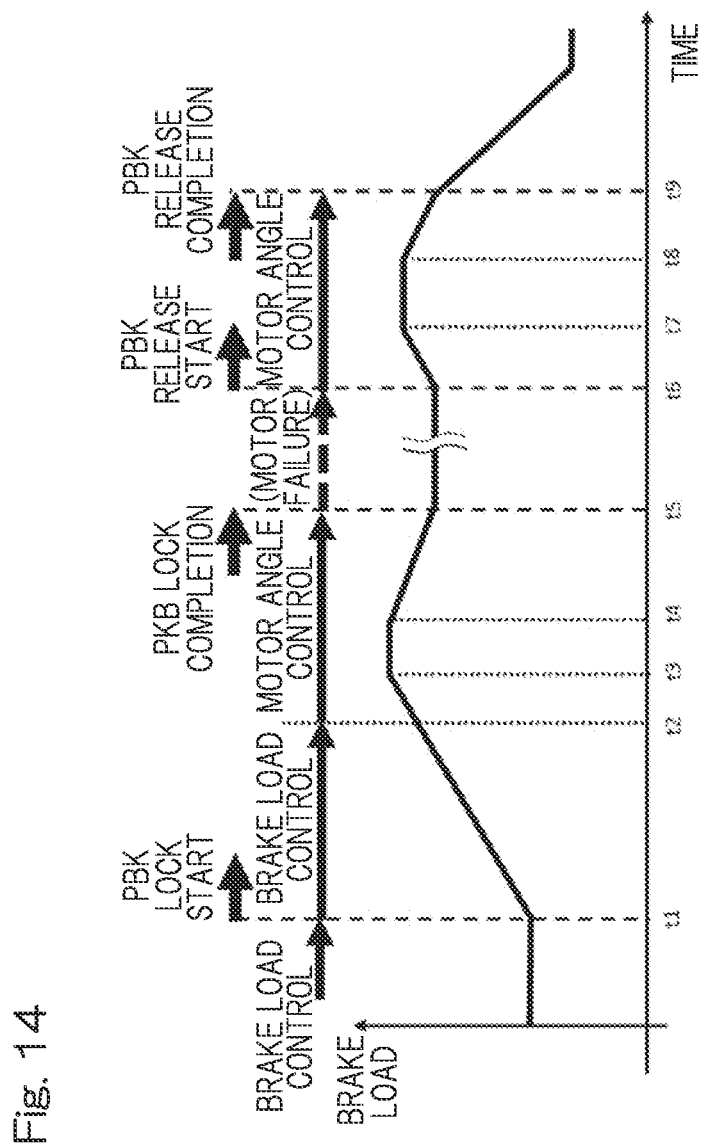

ELECTRIC-POWERED ACTUATOR AND ELECTRIC BRAKING DEVICE

CROSS REFERENCE TO THE RELATED APPLICATION

This application is a continuation application, under 35 U.S.C. § 111(a), of international application No. PCT/JP2020/012272, filed Mar. 19, 2020, which is based on and claims Convention priority to Japanese patent application No. 2019-062114, filed Mar. 28, 2019, the entire disclosures of all of which are herein incorporated by reference as a part of this application.

BACKGROUND OF THE INVENTION

Field of the Invention

The present invention relates to an electric-powered actuator and an electric braking device to be mounted in vehicles or the like.

Description of Related Art

The following technologies have been proposed as electric-powered actuators:
1. an electric brake having a parking brake function and including a lock mechanism provided on an outer periphery of a ratchet (Patent Document 1),
2. an electric-powered actuator including a planetary roller mechanism and an electric motor (Patent Document 2).

RELATED DOCUMENT

Patent Document

[Patent Document 1] JP Laid-open Patent Publication No. 2006-183809
[Patent Document 2] JP Laid-open Patent Publication No. 2006-194356

SUMMARY OF THE INVENTION

For example, there is a demand for electric-powered actuators capable of being locked while a predetermined load state is maintained without using power of a motor, such as parking brake mechanisms of the electric braking devices as described in Patent Documents 1 and 2.

In such cases, the electric-powered actuator as described in Patent Document 1 which includes a reverse-input holding mechanism which functions by engagement of a movable part with a stationary part is often required to reliably make a state transition to/from a reverse-input holding state, such as when the reverse-input holding state is entered or when the reverse-input holding state is released. For example, in the case where the reverse-input holding mechanism is employed in a parking brake function section of the electric braking device including the electric-powered actuator, failure of shift to the reverse-input holding state (i.e., a parking brake state) may lead to a problem that a vehicle on e.g. an inclined road moves on the inclined road against the intention of an operator, and failure of release of the parking brake may lead to a problem that the vehicle cannot start moving.

For example, where an engaging part is constructed with an inclined portion (such as a ratchet as shown in Patent Document 1) on an opposite side to a side on which a reverse input is received, so that engagement is released by the inclined portion, the provision of the inclined portion may increase the dimension of the engaging part and thus cause a problem that there is a greater variation in a holding load when a reverse input is held. Moreover, due to the relatively complicated structure of the engaging part, a processing cost may become undesirable. Further, when engagement is released by such an inclined portion or the like, it is necessary to appropriately control a friction coefficient, a control angle and the like of the inclined portion in order to reliably release the engagement, possibly causing problems such as increase in quality control costs or decrease in reliability of operation for holding a reverse input.

An object of the present invention is to provide an electric-powered actuator and an electric braking device which are capable of reliably operating a reverse-input holding mechanism and can achieve cost savings.

Hereinafter, for the sake of expediency, the present invention will be described with reference signs used in embodiments in order to facilitate understanding.

An electric-powered actuator according to the present invention is an electric-powered actuator DA including: an electric motor 4 including a rotor and a stator; and a control device 2 configured to drive and control the electric motor 4,
the electric-powered actuator further including: an engaged part Hk configured to synchronously move with the rotor; a lock mechanism Ks including a drive source 16 configured to drive an engaging part 15 such that the engaging part 15 is allowed to be engaged with and be disengaged from the engaged part Hk; and a reverse-input holding mechanism 7 configured to prevent rotation of the electric motor 4 by engagement of the engaging part 15 with the engaged part Hk to hold a load generated by the electric-powered actuator DA without using a torque of the electric motor 4,
wherein the control device 2 includes:
a motor angle estimation unit 22a configured to estimate a rotation angle of the electric motor 4; and
a reverse-input holding control section 24 having a function of engaging the engaging part 15 with the engaged part Hk by controlling the drive source 16 to set the reverse-input holding mechanism 7 into a reverse-input holding state while the electric-powered actuator DA is applying a load and a function of, from the reverse-input holding state, disengaging the engaging part 15 from the engaged part Hk to set the reverse-input holding mechanism 7 into a reverse-input holding release state,
the reverse-input holding control section 24 includes
an engagement intermediate control function section 24a configured to control the estimated rotation angle such that the engaged part Hk and the engaging part 15 come into a predetermined positional relation within a certain period of time, in either or both of when the engaging part 15 is brought into engagement with the engaged part Hk and when the engaging part 15 is brought out of engagement with the engaged part Hk.

The predetermined positional relation may be arbitrarily defined according to the design or the like. For example, a suitable positional relation may be determined by one or both of testing and simulation and be defined as the predetermined positional relation.

According to this constitution, the engagement intermediate control function section 24a is configured to keep the engaged part Hk and the engaging part 15 in such a positional relation that they do not come into contact with each other for a certain period of time necessary for the operation of the engaging part 15 when the engaging part 15 is brought into or out of the engagement with the engaged part Hk which synchronously moves with the rotor of the electric motor 4. In other words, the engagement intermediate control function section 24a is configured to control the rotation angle of the electric motor 4 in accordance with the operation of the engaging part 15 to maintain the engaging part 15 in an engagement intermediate state with respect to the engaged part Hk. Thus, by the subsequent rotation of the electric motor 4, the engaging part 15 can be reliably brought into or out of the engagement with the engaged part Hk such that a transition is more reliably made to the reverse-input holding state or the reverse-input holding release state. Thanks to such a control, the reverse-input holding mechanism 7 can be reliably operated, so that cost savings can be achieved, as compared with the conventional technologies including complicated structures and the like as mentioned above.

The control device 2 may include: a motor angle control section 23b configured to control an estimated motor angle, which is the rotation angle to be estimated, such that the estimated motor angle follows a target motor angle; a load estimation function section 21 configured to estimate a load to be applied by the electric-powered actuator DA on an external element; and a load control function section 23a configured to control an estimated load which is estimated by the load estimation function section 21 such that the estimated load follows a target load, and the control device 2 may be configured to execute the load control function section 23a until at least the electric-powered actuator DA generates a predetermined load when the reverse-input holding control section 24 sets the reverse-input holding mechanism 7 into the reverse-input holding release state, and to cause a switchover to the motor angle control section 23b when the engagement intermediate control function section 24a is to be executed.

The predetermined load may be arbitrarily defined according to the design or the like. For example, a suitable load may be determined by one or both of testing and simulation and be defined as the predetermined load.

In general, angle estimation by using e.g. an angle sensor can often achieve higher control resolution for motor angles than load estimation by using e.g. a load sensor or a flow rate sensor. Accordingly, in the present constitution, the load control function section 23a is executed until the electric-powered actuator DA generates a predetermined load when the reverse-input holding mechanism 7 is set to the reverse-input holding release state, and a switchover to the motor angle control section 23b is caused when the engagement intermediate control function section 24a is to be executed, so that the positional relation between the engaging part 15 and the engaged part Hk can be controlled more accurately. Therefore, it is possible to more accurately enter the reverse-input holding state or release the reverse-input holding state.

The reverse-input holding control section 24 may have a function of, when the engaging part 15 is brought into engagement with the engaged part Hk in transition from the reverse-input holding release state to the reverse-input holding state, gradually rotating the electric motor 4 in a direction corresponding to a direction of a reaction force torque due to the reverse input, from a rotation angle of the electric motor 4 when the electric-powered actuator DA is set to a state for generating a predetermined load according to a target load in the reverse-input holding state, and the reverse-input holding control section 24 may be configured to, on the basis of
an engagement drive time from a point at which the engaging part 15 starts an engaging operation with the engaged part Hk until the engaging part 15 completes the engaging operation, the engagement drive time being set on the basis of a driving force of the drive source 16 and an inertia of the engaging part 15 acting on the engaging part 15 during engagement, and
an engaged part gap angle by which the electric motor 4 is allowed to rotate with the reverse-input holding mechanism 7 put in engagement, the engaged part gap angle being set on the basis of a gap between the engaged part Hk and the engaging part 15 when the engaging part 15 is in engagement with the engaged part Hk,
gradually rotate the electric motor 4 in the direction corresponding to the direction of the reaction force torque due to the reverse input by an angular shift amount of the electric motor 4, the angular shift amount being set such that an angular shift of the electric motor 4 within the engagement drive time is smaller than the engaged part gap angle.

The predetermined load may be arbitrarily defined according to the design or the like. For example, a suitable load may be determined by one or both of testing and simulation and be defined as the predetermined load.

According to this constitution, where an absolute position of the engaged part Hk with respect to the motor angle is unknown, the electric motor 4 is gradually rotated in the direction corresponding to the direction of the reaction force torque due to the reverse input by the angular shift amount of the electric motor 4 which is set such that the angular shift of the electric motor 4, within the engagement drive time, is smaller than the engaged part gap angle, so that the engaging part 15 can be reliably brought into engagement with the engaged part Hk.

The reverse-input holding control section 24 may have a function of storing a rotation angle of the electric motor 4 in the reverse-input holding state and
may be configured to, when the reverse-input holding state is to be released, rotate the electric motor 4 in a direction opposite to the direction of the reaction force torque due to the reverse input, from the stored rotation angle in the reverse-input holding state by a motor angle which is set on the basis of shapes of the engaging part 15 and the engaged part Hk, the motor angle being not zero and smaller than an engaged part gap angle by which the electric motor 4 is allowed to rotate with the reverse-input holding mechanism 7 put in engagement, and
to maintain the electric motor 4 in a state where the electric motor 4 has been rotated in the direction opposite to the direction of the reaction force torque due to the reverse input by the motor angle which is not zero and smaller than the engaged part gap angle during a disengagement drive time from a point at which the engaging part 15 starts a disengaging operation from the engaged part until the engaging part 15 completes the disengaging operation, the disengagement drive time being set on the basis of a driving force of the drive source 16 and an inertia of the engaging part 15 acting on the engaging part 15 during disengagement.

According to this constitution, since an absolute position of the engaged part Hk with respect to the motor angle is known in advance when the reverse-input holding state is to be released, the reverse-input holding state can be reliably released by maintaining a state where a gap is defined between the engaged part Hk and the engaging part 15 during the disengagement drive time of the lock mechanism Ks.

In the control device 2, the load control function section 23a may have a function of calculating a load control target motor angle, which is a motor angle used as a load control target, from the target load on the basis of a relation between the estimated load and the rotation angle to be estimated, correcting, under a predetermined estimated load, one or both of a load control target motor angle and an actual estimated motor angle on the basis of a load difference between the load control target motor angle calculated from the predetermined estimated load on the basis of the relation and the actual estimated motor angle under the predetermined estimated load, and performing follow-up control of the motor angle based on a correction result, and an operation of causing a switchover to the motor angle control section 23b when the engagement intermediate control function section 24a is to be executed is an operation of stopping correction of the motor angle based on the load difference.

The predetermined estimated load may be arbitrarily defined according to the design or the like. For example, a suitable load may be determined by one or both of testing and simulation and be defined as the predetermined estimated load.

In this case, the load control of the electric-powered actuator DA is composed substantially as motor angle control, and the correction of the motor angle is turned on and off to cause a control switchover, so that the control can be smoothly switched.

The control device 2 may be configured to, when the engagement intermediate control function section 24a controls the estimated motor angle such that the engaged part Hk and the engaging part 15 are brought into a predetermined positional relation within a certain period of time, execute the motor angle control section 23b by using, as a target motor angle, a motor angle calculated from the estimated motor angle immediately before a switchover to the motor angle control section 23b and from a predetermined motor angle adjustment bias. In this way, the motor angle control section 23b can be executed.

In the reverse-input holding mechanism 7, the engaging part 15 of the lock mechanism Ks is a movable part configured to linearly move with respect to the engaged part Hk, and the engaged part Hk is formed with holes ha or grooves mz having contact surfaces parallel to a direction of linear motion of the engaging part 15 with respect to both rotation directions of the electric motor 4. In this case, the engaged part Hk is formed with simple holes ha or grooves mz, so that there is a small pitch between the adjacent holes or grooves in a circumferential direction of the engaged part Hk. This makes it possible to finely adjust a reverse-input holding load and to reduce processing costs.

An electric braking device 1 according to the present invention includes: a brake rotor 8; a friction member 9 configured to come into contact with the brake rotor 8 to generate a braking force; and the electric-powered actuator DA having any of the above constitutions according to the present invention, the electric-powered actuator DA being configured to generate a pressure load to control the braking force when the friction member 9 is operated to come into contact with the brake rotor 8, wherein the reverse-input holding mechanism 7 serves as a parking brake mechanism configured to hold a contact load between the brake rotor 8 and the friction member 9 with a predetermined pressure load without using a torque of the electric motor 4.

The predetermined pressure load may be arbitrarily defined according to the design or the like. For example, a suitable pressure load may be determined by one or both of testing and simulation and be defined as the predetermined pressure load. According to this constitution, the effects as described for the electric-powered actuator DA according to the present invention can be obtained. Since the parking brake mechanism can be reliably actuated, it is possible to surely prevent a vehicle from undesirably rolling back on an inclined road or the like.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like or corresponding parts throughout the several views.

FIG. 14 illustrates another exemplary operation of the parking brake mechanism;

DESCRIPTION OF THE EMBODIMENTS

First Embodiment

Figure 1:
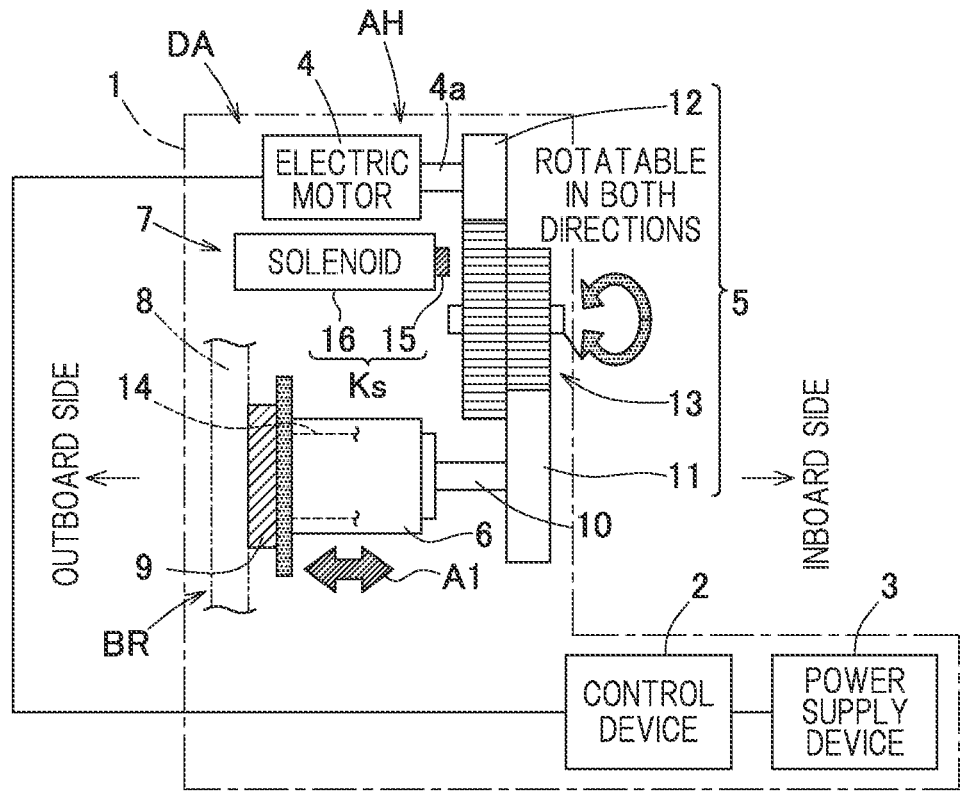
FIG. 1 schematically shows an electric braking device according to a first embodiment of the present invention.
Figure 3:
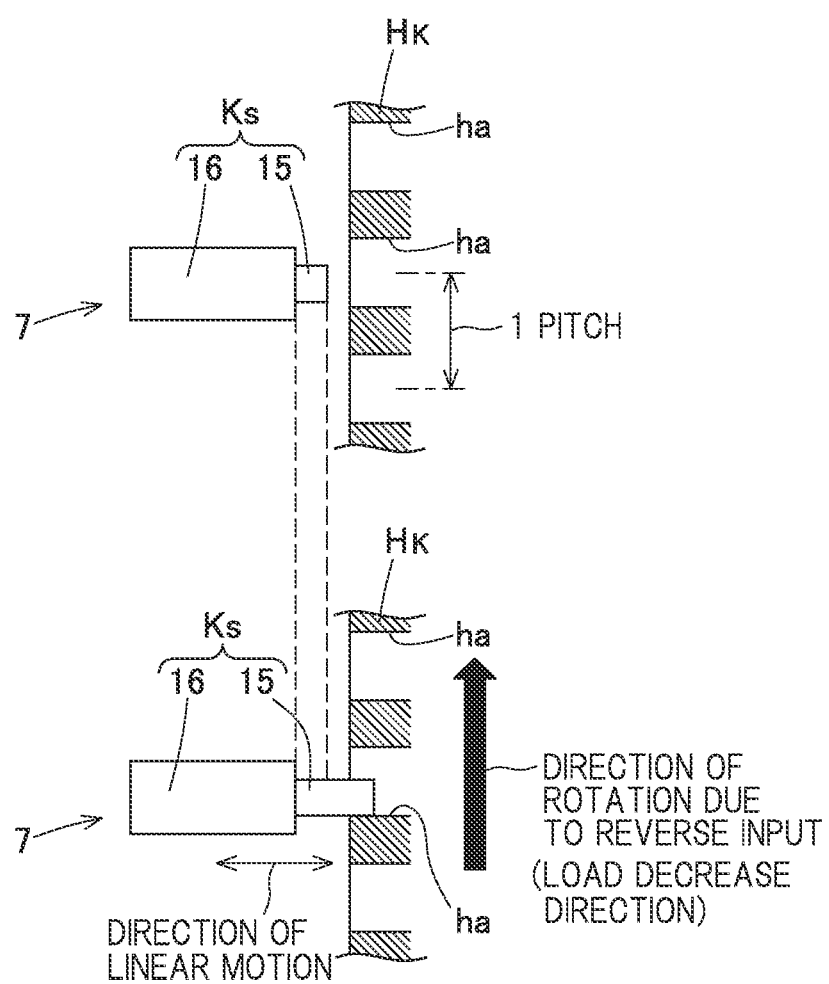
FIG. 3 schematically shows engagement and disengagement of an engaging part with/from an engaged part in the reverse-input holding mechanism.
Figure 4:
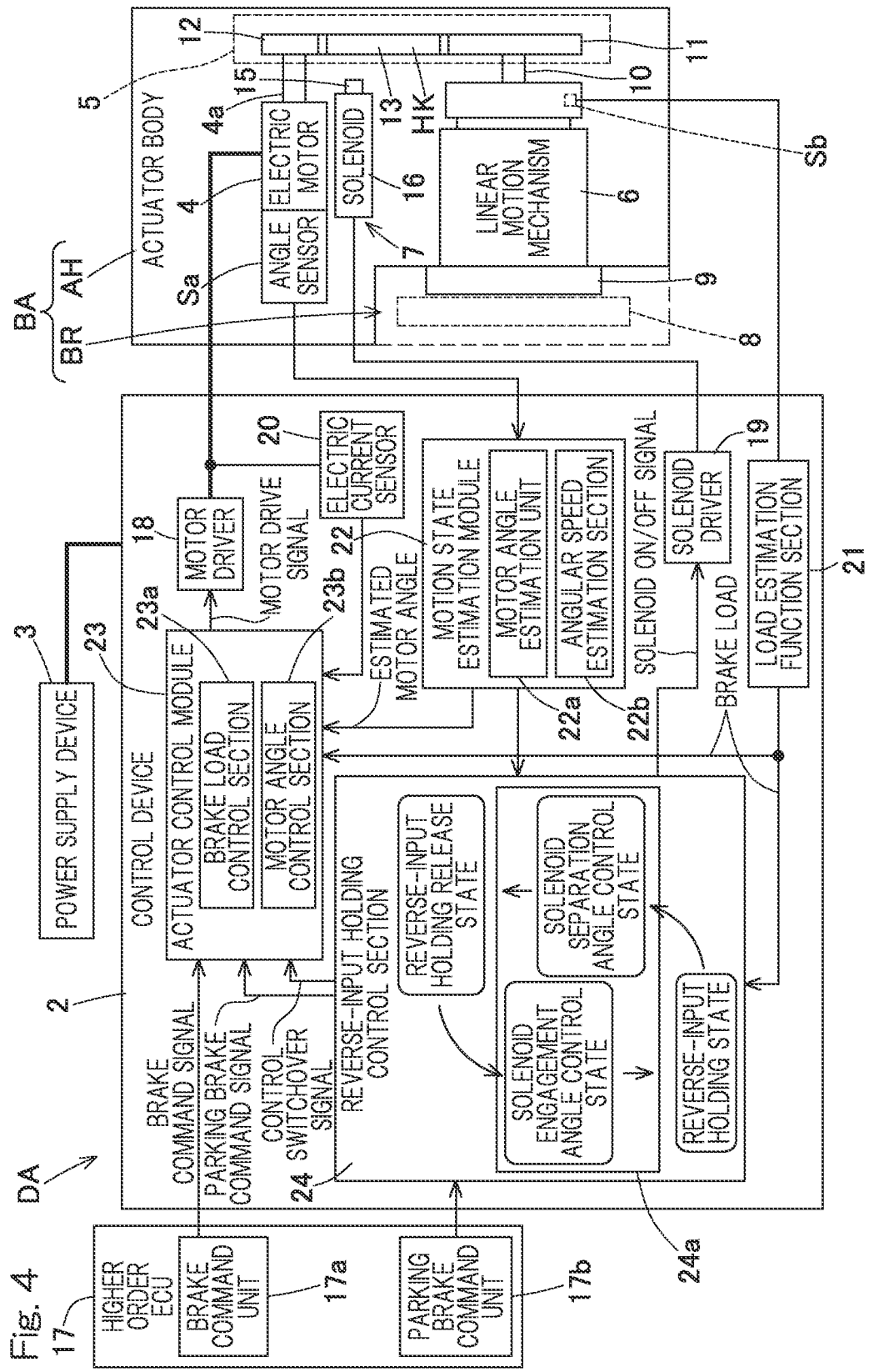
FIG. 4 is a block diagram of a control system of an electric-powered actuator of the electric braking device.

An electric braking device including an electric-powered actuator according to an embodiment of the present invention will be described with reference to FIG. 1 to FIG. 14. The electric braking device may be, for example, mounted in a vehicle. As shown in FIG. 1, the electric braking device 1 includes an electric-powered actuator DA and a friction brake BR. First of all, the structures of the electric-powered actuator DA and the friction brake BR will be described.
Structures of Electric-Powered Actuator DA and Friction Brake BR The electric-powered actuator DA includes an actuator body AH, a power supply device 3, and a control device 2 as described later. The actuator body AH includes an electric motor 4, a linear motion mechanism 6, a speed reducer 5, a parking brake mechanism 7, an angle sensor Sa (FIG. 4), and a load sensor Sb (FIG. 4). As shown in FIG. 4, the brake actuator BA is constituted by the actuator body AH and the friction brake BR.

As shown in FIG. 1 and FIG. 4, the electric motor 4 includes a rotor and a stator and may be constituted as e.g. a permanent magnet synchronous motor. Use of a permanent magnet synchronous motor as the electric motor 4 is preferable in terms of space saving, high efficiency and high torque. The friction brake BR is provided to each wheel of a vehicle. The friction brake BR includes a brake rotor 8 which rotates in conjunction with a wheel and a friction member 9 which comes into contact with the brake rotor 8 to generate a braking force. The friction member 9 is operated by the electric-powered actuator DA. A mechanism may be employed for operating the friction member 9 by the actuator body AH of the electric-powered actuator DA such that the friction member is pressed against the brake rotor 8 to generate a pressure load by a friction force. In this example, the friction brake BR is a disc brake device including a brake rotor 8, which is a brake disc, and a non-illustrated caliper. Instead, the friction brake BR may be a drum brake device including a drum and a lining.

The speed reducer 5 is a mechanism for reducing a speed of rotation of the electric motor 4 and includes a first gear 12, a middle (second) gear 13 and a third gear 11 each serving as a transmission part. In this example, the speed reducer 5 is a parallel gear system in which rotation of the first gear 12 attached to a rotor shaft 4a of the electric motor 4 can be transmitted to the third gear 11 fixed to an end portion of a rotation shaft 10, with the speed of the rotation being reduced by the middle gear 13.

The linear motion mechanism 6 is a mechanism for converting rotary motion outputted by the speed reducer 5 into linear motion of a linear motion part 14 through a feed screw mechanism so as to bring the friction member 9 into contact with the brake rotor 8 or separate the friction member 9 from the brake rotor 8. The linear motion part 14 is locked in a nonrotatable manner and is supported so as to be movable in an axial direction indicated by arrow A1 (in FIG. 1). The friction member 9 is arranged at an outboard side end of the linear motion part 14. The rotation of the electric motor 4 is transmitted to the linear motion mechanism 6 through the speed reducer 5, so that the rotary motion is converted into the linear motion which is in turn converted into a pressing force of the friction member 9 to generate a braking force. It should be noted that an "outboard side" refers to a side closer to an outside of a vehicle in a widthwise direction of the vehicle in a state where the electric braking device 1 is mounted in the vehicle, and an "inboard side" refers to a side closer to a center of the vehicle in the widthwise direction of the vehicle in that state.

As shown in FIG. 4, the angle sensor Sa detects a rotation angle (motor angle) of the electric motor 4. For example, the angle sensor Sa may preferably be a resolver or a magnetic encoder in terms of high accuracy and high reliability. Alternatively, the angle sensor Sa may be various sensors such as an optical encoder etc. Instead of using the angle sensor Sa, the control device 2 as described later may perform sensorless angle estimation for estimating a motor angle on the basis of a relation between a voltage and an electric current in the electric motor 4.

The load sensor Sb detects an axial load of the linear motion mechanism 6. For example, the load sensor Sb may preferably be a sensor for detecting strain, or deformation or the like according to the load of the linear motion mechanism 6 in terms of low cost and high accuracy. The load sensor Sb may be a pressure-sensitive medium such as a piezoelectric element, or a torque sensor for detecting a braking torque of the brake rotor 8, or in a case where the electric braking device 1 is adapted for a vehicle, an acceleration sensor for detecting a deceleration in a front-rear direction of the vehicle. Alternatively, the control device 2 may perform sensorless estimation on the basis of a predetermined correlation such as a correlation between actuator rigidity and motor angle or a correlation between actuator load and motor torque, without employing a load sensor.
Exemplary Configuration of Reverse-Input Holding Mechanism (Parking Brake Mechanism)

Figure 2:
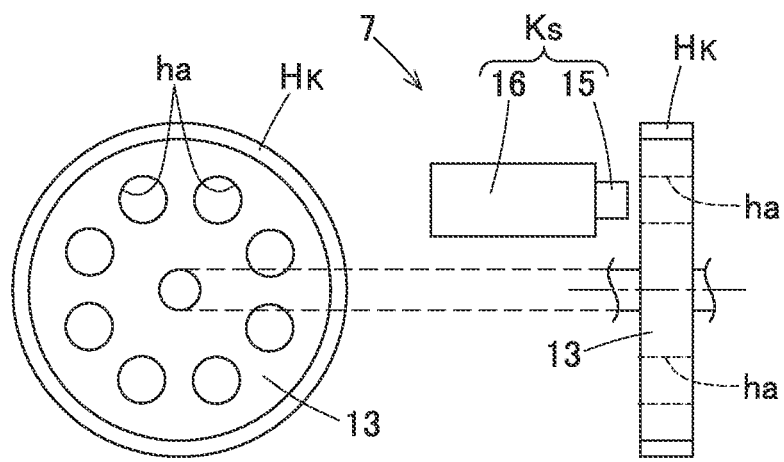
FIG. 2 shows an exemplary configuration of a reverse-input holding mechanism of the electric braking device.

As shown in FIG. 1 and FIG. 2, the parking brake mechanism 7 is a reverse-input holding mechanism for holding a load (brake load) generated by the electric-powered actuator DA, without using a torque of the electric motor 4. The parking brake mechanism 7 includes: an engaged part Hk formed with a plurality of holes ha; and a lock mechanism Ks including a solenoid 16 which is a drive source for driving an engaging part 15 such that the engaging part 15 is allowed to be engaged with and be disengaged from each hole ha of the engaged part Hk.

In this example, the engaged part Hk corresponds to the middle gear 13 of the speed reducer 5, and the middle gear 13 has an end face, in a direction of its rotation axis, formed with a plurality of holes ha at equal intervals in a circumferential direction of the middle gear. As shown in FIG. 2 and FIG. 3, the engaged part Hk is formed with the holes ha having contact surfaces parallel to a direction of linear motion of the engaging part 15 with respect to both rotation directions of the electric motor 4 (FIG. 1). To hold a reverse input by this structure, the engaging part 15 protrudes from the solenoid 16, which is held by a stationary system such as a housing and faces one of the holes ha, and is engaged with the one of the holes ha, so that rotation of the electric motor 4 (FIG. 1) is prevented. The engagement is held by a fiction force on a contact surface against the reverse input without using a torque of the electric motor 4 (FIG. 1). The respective holes ha may be through holes which axially penetrate the engaged part as exemplarily shown in FIG. 2 or non-through holes which do not penetrate the engaged part and have a predetermined depth. The shape of the holes ha is not limited to a round shape and may be any shape such as oblong shapes, drilled shapes, and polygonal shapes. Instead of the holes ha, an uneven part may be formed along the circumferential direction on the end face in the direction of its rotation axis.

The solenoid 16 generates an excitation magnetic field by a solenoid coil to drive the engaging part 15 as a movable part by an electromagnetic force such that the engaging part 15 (which is an engagement pin) is engaged with the opposing engaged part Hk provided in the speed reducer 5 (FIG. 1) so as to lock the rotation of the middle gear 13 as a movable part, which moves in conjunction with the electric motor 4 (FIG. 1) and thus attains a parking lock state (reverse-input holding state). In order to attain an unlock state (reverse-input holding release state), the engaging part 15 is disengaged from the engaged part Hk to allow the middle gear 13 to rotate.

In this constitution, in terms of low cost and power saving, the solenoid 16 may preferably be provided with an urging unit (not illustrated) such as a spring for keeping the engaging part 15 away from the engaged part Hk, so that the lock is enabled by generating an electromagnetic force exceeding an urging force of the urging unit by application of an electric current, instead of polarity. It should be noted that, for example, the solenoid 16 may be provided with a field part such as a magnet in the engaging part 15 (which is an engagement pin), so that the engaging part 15 is driven in two directions in accordance with a direction of an electric current of the solenoid coil.

Instead of the solenoid 16, a DC motor and a screw mechanism may be provided as the drive source for locking the engaged part Hk. The engaged part Hk may preferably be provided in the speed reducer in terms of space saving. For example, the engaged part Hk may be provided in any part which operates in conjunction with the rotation of the motor, such as the rotor of the electric motor 4 (FIG. 1) or the linear motion mechanism 6 (FIG. 1). As a non-illustrated feature, various sensors such as a thermistor may be additionally provided according to requirements.

Constitution of Control Device

FIG. 4 is a block diagram of a control system of the electric-powered actuator DA of the electric braking device 1. For example, a control device 2 and a brake actuator BA are provided for each wheel. Each control device 2 controls a corresponding electric motor 4. Each control device 2 is connected to a direct-current power supply device 3 and a higher order ECU 17 which is a superordinate control unit to the control device 2. The power supply device 3 supplies electric power to the electric motor 4 and the control device 2. For example, the power supply device 3 may be a low-voltage (for example, 12V) battery or a step-down converter for stepping down a voltage of a high-voltage battery in an electric braking device 1 for an automobile. Alternatively, the power supply device 3 may be a large-capacity capacitor or the like, or a parallel arrangement of such capacitors for redundancy.

The higher order ECU 17 is, for example, a vehicle integrated control device (vehicle control unit or VCU) for controlling a whole vehicle. The higher order ECU 17 has a function of controlling the respective control devices 2 in an integrated manner. The higher order ECU 17 includes a brake command unit 17a and a parking brake command unit 17b. The brake command unit 17a gives, as a brake command signal to the respective control devices 2, a sensor output which varies in accordance with e.g. an operation amount of a brake operation unit such as a brake pedal in a vehicle.

For example, the brake command unit 17a may be the brake operation unit (such as a brake pedal) per se or could be an element for automatically calculating and outputting a command value (brake command signal) on the basis of a vehicle state and information from various sensors, without relying on an operation of the brake operation unit, as in the case of e.g. autonomous vehicles. The parking brake command unit 17b is a parking brake switch or the like and gives a parking brake command signal to the control devices 2 on the basis of an operation by an operator or a vehicle state and information from various sensors as in the case of e.g. autonomous vehicles.

Each control device 2 includes a miscellaneous control calculation module for performing control calculation, a motor driver 18, a solenoid driver 19, and an electric current sensor 20. The miscellaneous control calculation module includes a load estimation function section 21, a motion state estimation module 22, an actuator control module 23, and a reverse-input holding control section 24. The load estimation function section 21 estimates, on the basis of an output of the load sensor Sb, a brake load which is a load to be applied on an external element by the electric-powered actuator DA. It should be noted that the load estimation function section 21 may perform sensorless estimation without using the load sensor Sb as described above.

The motion state estimation module 22 estimates a rotary motion state of the electric motor 4 on the basis of an output of the angle sensor Sa. The motion state estimation module 22 includes a motor angle estimation unit 22a for estimating an angle (rotation angle) of the rotor of the electric motor 4 and an angular speed estimation section 22b for estimating an angular speed of the electric motor 4. Alternatively, the motion state estimation module 22 may have, for example, a function of estimating a predetermined differential/integral value such as an angular acceleration or the like of the electric motor 4 and a function of estimating disturbances.

The motor angle estimation unit 22a also has a function of, when estimating a rotation angle of the electric motor 4, suitably calculating a necessary physical quantity on the basis of control constitution, such as an electrical angle phase for electric current control and a total rotation angle for angle control, with correction of an overlap and an underlap of the angle sensor Sa. Besides, the rotation angle and the angular speed may be, for example, an angle of a predetermined part of the speed reducer 5 calculated on the basis of a reduction ratio, or a position and a speed calculated on the basis of an equivalent lead or the like, instead of the rotor of the electric motor 4. For example, the estimation of the physical quantity may be performed by using a feature of a state estimation observer or the like or by directly calculating the quantity by backward calculation based on a differential equation or inertial equation.

For example, the electric current sensor 20 may be a sensor constituted by an amplifier for detecting a voltage between opposite ends of a shunt resistor or a non-contact sensor for detecting a magnetic flux or the like around an electric current application path of a phase current of the electric motor 4. As a different constitution, for example, the electric current sensor 20 may detect a terminal voltage of an element constituting the motor driver 18. The electric current sensor 20 may be arranged between phases of the electric motor, or one or more electric current sensors be arranged on a low side or on a high side. Alternatively, the control device 2 can perform feed-forward control based on motor characteristics or the like, such as an inductance or a resistance value of the electric motor 4, without employing any electric current sensor.

The actuator control module 23 has a function of calculating an operation amount for the brake actuator BA to desirably follow a predetermined command input and converting it into a motor drive signal. The actuator control module 23 includes a brake load control section 23a which is a load (brake load) control function section, and a motor angle control section 23b. The actuator control module 23 causes a switchover between the brake load control section 23a and the motor angle control section 23b according to requirements. The brake load control section 23a is a control section for mainly controlling a brake load (braking force). The motor angle control section 23b controls an estimated motor angle which is the rotation angle to be estimated such that the estimated motor angle follows a target motor angle. As a non-illustrated function, the actuator control module 23 may preferably have an electric current control module for controlling a motor electric current as well as a function of determining a motor electric current for exhibiting a desirable motor torque based on motor output characteristics, so that highly functional control can be executed.

The reverse-input holding control section 24 has a function of putting the parking brake mechanism 7 which is the reverse-input holding mechanism into a reverse-input holding release state, a solenoid engagement angle control state, a reverse-input holding state, and a solenoid separation angle control state as described later. The reverse-input holding control section 24 has a control calculation function of, when the electric-powered actuator DA is applying a load (i.e., a predetermined brake load), operating the electric motor 4 and the solenoid 16 in cooperation with each other in order to bring the engaging part 15 into engagement with the engaged part Hk by controlling the solenoid 16 to hold the brake load without driving the electric motor 4.

In particular, the reverse-input holding control section 24 includes an engagement intermediate control function section 24a for controlling an estimated motor angle such that the engaged part Hk and the engaging part 15 come into a predetermined positional relation within a certain period of time, both when the engaging part 15 is brought into engagement with the engaged part Hk and when the engaging part 15 is brought out of engagement with the engaged part Hk. The engagement intermediate control function section 24a has a function of putting the reverse-input holding mechanism in the solenoid engagement angle control state and the solenoid separation angle control state as mentioned above.

The reverse-input holding release state may be a state where the engaging part 15 is in disengagement from the engaged part Hk, so that a normal service brake can be used. In this case, a control switchover signal is given to execute brake load control by the brake load control section 23a, and the brake actuator BA operates in accordance with a brake command input (brake command signal).

The solenoid engagement angle control state is a state where a motor angle is controlled to bring the engaging part 15 of the solenoid 16 into engagement with the engaged part Hk. In this case, a control switchover signal is given to execute motor angle control by the motor angle control section 23b, and, for example, with the position of the engaged part Hk and the position of the engaging part 15 of the solenoid 16 being held in an engageable positional relation, an electric current can be applied to the solenoid 16 to lock the engaged part Hk.

The reverse-input holding state is a state where the engaged part Hk is put into a lock state by being locked by the engaging part 15 of the solenoid 16, and the lock state is held by a friction force generated by a reverse input acting on a contact surface of the engaged part Hk in contact with the engaging part 15, without using motor power. In this case, the electric motor 4 may be in a failure state in which no electric current is being supplied, or in a state where the electric motor continues to execute control with low power consumption (e.g. with zero torque), or in a combined state thereof. While the reverse input is held, a control switchover signal according to a target state of the electric motor 4 is outputted from the reverse-input holding control section 24 to the actuator control module 23.

The solenoid separation angle control state is a state where a motor angle is controlled to disengage the engaged part Hk from the engaging part 15 of the solenoid 16. In this case, a control switchover signal is given to execute motor angle control by the motor angle control section 23b, and, for example, where the solenoid 16 includes an urging unit such as a separation spring, the engaged part Hk is driven in an opposite direction from the direction of a reverse input (i.e., onto a side toward which a brake load increases) until the friction force no longer acts, so that the engaged part Hk is unlocked by a spring force of the separation spring. Where a bidirectionally driven solenoid, or a bidirectionally driven DC motor or the like is used instead of the solenoid 16 including the separation spring or the like, the solenoid or the DC motor is driven to disengage the engaging part 15, with the friction force no longer acting, so that engaged part Hk is unlocked.

The motor driver 18 controls electric power to be supplied to the electric motor 4. The motor driver 18 may include, for example, a half-bridge circuit including a switch element such as a field effect transistor (abbreviated as FET) and may be configured to perform PWM control for determining a motor application voltage in accordance with an ON-OFF duty cycle of the switch element in terms of cost savings and high performance. Alternatively, the motor driver 18 may be provided with a transformer circuit and be configured to perform PAM control.

The solenoid driver 19 drives and controls the solenoid 16 in accordance with a solenoid ON/OFF signal given from the reverse-input holding control section 24. The solenoid driver 19 may preferably be constituted by, for example, a switch element such as a field effect transistor or a bipolar transistor in terms of cost savings. In a case where a solenoid 16 including a separation spring is used, one such switch element may be provided as a switch for permitting/interrupting an electric current from the power supply device 3 to the solenoid 16, or a switch for permitting/interrupting an electric current from the solenoid 16 to the ground. It is also possible to provide both switches for redundancy. In a case of the bidirectionally driven solenoid or the bidirectionally driven DC motor, a bridge circuit including at least four switch elements may be constituted.

As a non-illustrated feature, it is preferable that the motor driver 18 or the solenoid driver 19 is directly powered by the power supply device 3, and that a compact step-down converter is provided for the miscellaneous control calculation module or the like in the control device 2. Alternatively, it is possible to supply electric power to one or both of the motor driver 18 and the solenoid driver 19 via a step-up converter or boost converter.

FIG. 4 shows an exemplary configuration of the electric braking device 1 including the parking brake mechanism 7 for a vehicle, and the device may be applied to a vehicle such as an automobile, a railway vehicle, or the like. Such a configuration may also be applied to an electric-powered actuator DA including a reverse-input holding mechanism for other uses. For example, the configuration may also be applied to a brake for stopping rotation of a wind turbine or a water turbine having a clamp holding function with low power consumption, or to an electric press device having a press pressure holding function. In such exemplary applications, peripheral modules of the control device 2 such as the brake command unit 17*a* and the parking brake command unit 17*b* are suitably configured for each application.

Exemplary Operation Flow for Holding Reverse Input

Figure 5:
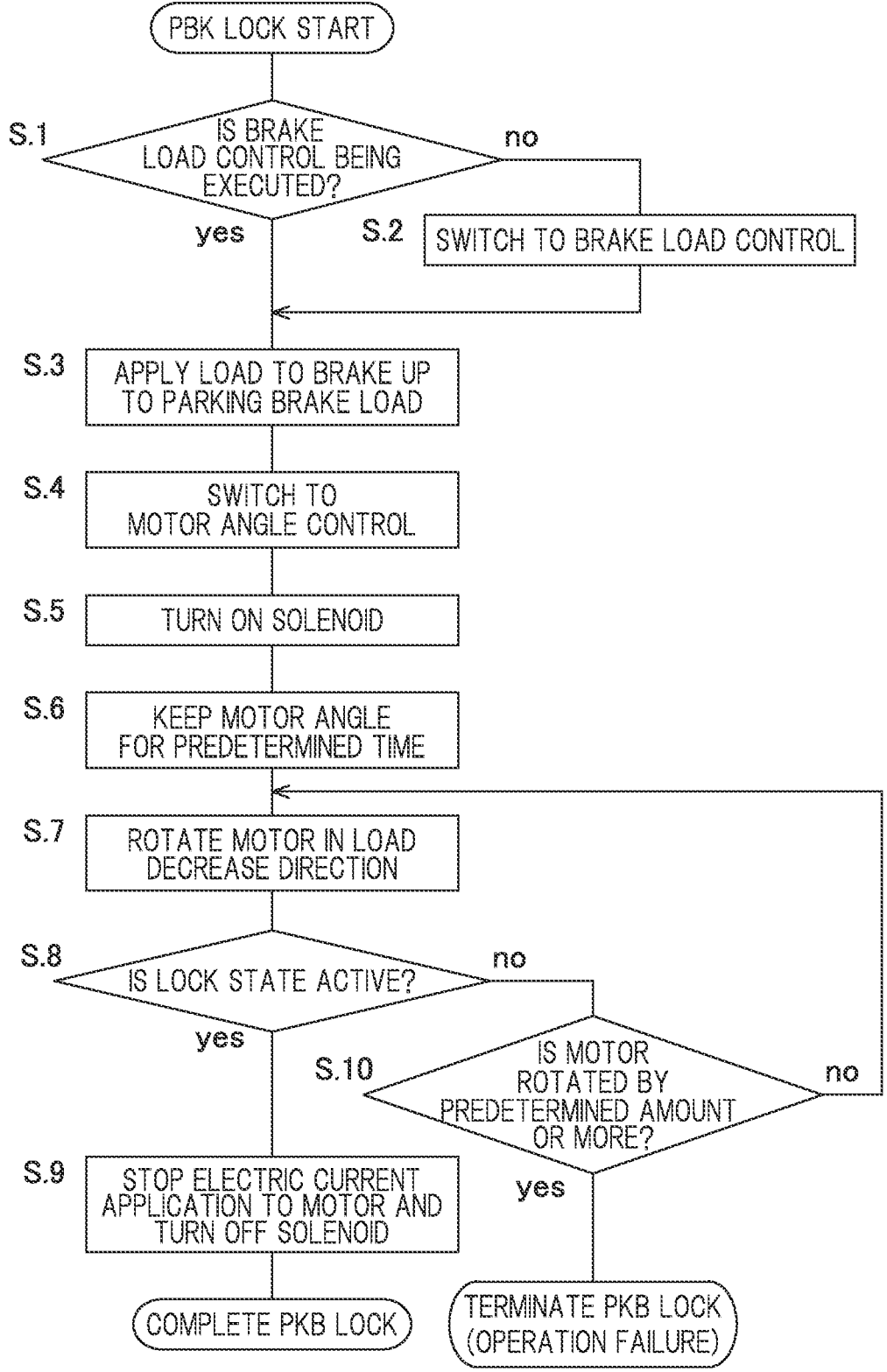
FIG. 5 is a flowchart illustrating an exemplary operation of a parking brake mechanism of the electric braking device.

FIG. 5 is a flowchart illustrating an exemplary operation of the parking brake mechanism of the electric braking device of FIG. 4. As shown in FIG. 4 and FIG. 5, the operation flow is an internal flow of the reverse-input holding control section 24 and the actuator control module 23. It should be noted that a same basic operation flow is employed in an electric valve device (FIG. 17) as described later as well as other applications.

A condition for starting locking the parking brake mechanism 7 (PBK) may be, for example, one when a parking brake switch is operated by an operator to turn on the parking brake mechanism. Alternatively, for example, where the parking brake mechanism is automatically operated while the vehicle is stationary for a relatively long period of time or while the autonomous vehicle is parked, the condition may be generation of a signal independent of an operation by an operator.

After starting locking the parking brake mechanism PBK, if the brake load control is not being executed (step S1: no), the control switchover signal is given to cause a switchover to the brake load control (step S2), and the process proceeds to step S3. An example of a case where the brake load control is not being executed may be the case where clearance control (e.g. motor angle control) is being executed to provide a predetermined clearance between the friction member 9 and the brake rotor 8 while the brake is released. If the brake load control is being executed (step S1: yes), the process proceeds to step S3.

In step S3, the brake load control is executed by the brake load control section 23*a* to apply a load to the brake up to a predetermined load (i.e., a parking brake load). In this regard, a target brake load (target load) which is set as the parking brake load may be a predetermined brake load which is determined on the basis of a predetermined parking brake load and also in consideration of, in the case where the reverse-input holding mechanism is applied, the influence of a brake load variation per pitch depending on a pitch between the adjacent holes ha, ha (FIG. 3) in the circumferential direction of the engaged part Hk, a reduction ratio, and a screw lead, etc.

When the predetermined parking brake load is reached, the control switchover signal causes a switchover from the brake load control to the motor angle control by the motor angle control section 23*b* (step S4). Then, the solenoid is turned on (step S5). Turning on the solenoid means, for example, an operation of applying an electric current to the solenoid coil in the solenoid 16 in which the engaging part 15 is caused to protrude by an attraction force of the solenoid coil and is separated by a spring reaction force or, for example, an operation of applying an electric current in a direction for causing the lock mechanism to protrude in the solenoid or the DC motor which is bidirectionally driven in accordance with a direction of an electric current. It should be noted that steps S4 and S5 may be carried out in a reversed order such that the solenoid is turned on before causing a switchover to the motor angle control, or these steps may be carried out simultaneously.

The engagement intermediate control function section 24*a* keeps a constant motor angle for a predetermined period of time (certain period of time) until the solenoid 16 completes a protrusion operation, i.e. in order to secure a time required for the solenoid 16 to protrude (step S6). For example, the predetermined period of time may be determined on the basis of a solenoid protrusion time calculated from a protrusion stroke amount of the solenoid, a weight of the engaging part 15 which is a movable part, a solenoid driving force, or the like. Preferably, the predetermined period of time may be set to a time determined also in consideration of the influence of sliding resistance, temperature change, variation in the driving force due to individual difference, or the like. It should be noted that this operation may be implemented as angular speed control with, for example, a target angular speed set to zero.

Next, the electric motor 4 is rotated by a predetermined amount in a load decrease direction (see FIG. 3) to bring the engaging part of the solenoid into engagement with the engaged part (step S7). In this regard, for example, where a gear of the speed reducer 5 is used as the engaged part Hk, since the relative positional relation of the engaged portion Hk with respect to the motor angle is often unknown, it is necessary to sufficiently slowly change the motor angle in the load decrease direction such that the solenoid 16 can protrude so as to be engaged with the engaged part Hk.

Specifically, first, if the solenoid 16 protrudes in a positional relation where the engaged part Hk is not matched with the engaging part 15 of the solenoid 16 (for example, where a solenoid pin and a hole of the engaged part Hk are not on a substantially same line), a tip end of the engaging part 15 comes into contact with an axial end face of the engaged part Hk and stops there in the middle of its stroke. Then, as the electric motor 4 and the engaged part Hk rotate in the load decrease direction, the engaging part 15 of the solenoid 16 protrudes from the middle stroke position (the middle of its stroke) to a full stroke position when relative positions of the engaged part Hk and the engaging part 15 of the solenoid 16 are matched.

Accordingly, for example, if a motor angular speed is too high with respect to a time required for the engaging part 15 to protrude from the middle stroke position to the full stroke position, the lock may be executed with the solenoid protruding incompletely, or the lock may be unsuccessful. Therefore, the motor angular speed $\omega sn$ should satisfy at least $|\omega sn| < |\theta lk/tsn|$, in which $\theta lk$ denotes an angle by which the electric motor 4 and the engaged part Hk are allowed to rotate due to a gap or the like between the engaged part Hk and the engaging part 15 when the engaging part 15 of the solenoid 16 is in engagement (when the engaging part 15 of the solenoid 16 is inserted into a hole of the gear); and tsn denotes a time required for the engaging part 15 to protrude from the stroke middle position to the full stroke position.

In addition, the motor angular speed ωsn may preferably be set in consideration of the influence of sliding resistance, temperature change, variation in the driving force due to individual difference, a predetermined safety factor based on design requirements, or the like. This operation may be implemented by angle control in which a motor angle command value is shifted with a constant gradient or by angular speed control which employs a constant motor angular speed command.

Where a positional relation of the engaged part Hk can be determined in advance, such as where the engaged part Hk is provided to a motor shaft, the motor angle may be stopped in advance at a position where the engaged part Hk and the engaging part 15 of the solenoid 16 are in an engageable positional relation, and then, the engaging part 15 of the solenoid 16 may be caused to protrude. Further, the motor rotation operation for the engagement is not restricted in terms of the motor angular speed as described above, and it is only necessary to surely bring the engaging part 15 into contact with a contact surface of a hole of the engaged part Hk.

Next, it is determined whether the lock state is active (step S8), and if the lock state is active (step S8: yes), electric current application to the electric motor 4 and the solenoid 16 is stopped (step S9). For example, when a motor angle is maintained for a certain period of time despite an attempt to rotate the electric motor 4, it is determined that the lock state is active. If the lock state is not active (step S8: no), the rotation state of the electric motor 4 after starting load decrease in step S7 is checked (step S10). If the rotation amount of the electric motor 4 is in sufficient (step S10: no), the process returns to step S7, and the electric motor 4 is further rotated in the load decrease direction. If the rotation amount of the electric motor 4 is excessive (step S10: yes), this process is terminated as a lock operation failure. The rotation amount may preferably be set on the basis of, for example, a pitch dimension between the adjacent holes ha, ha (FIG. 3) of the engaged part Hk in the circumferential direction.

In the present example, it is shown that in step S9, application of an electric current to the electric motor 4 and the solenoid 16 is stopped after locking. However, this operation can be set suitably to system design requirements. For example, in order to shorten a start-up time of the control device 2, the electric motor 4 may be kept on standby with the motor driving in a power saving mode with zero torque or with zero electric current, or these operations may be performed in combination.

Figure 6:
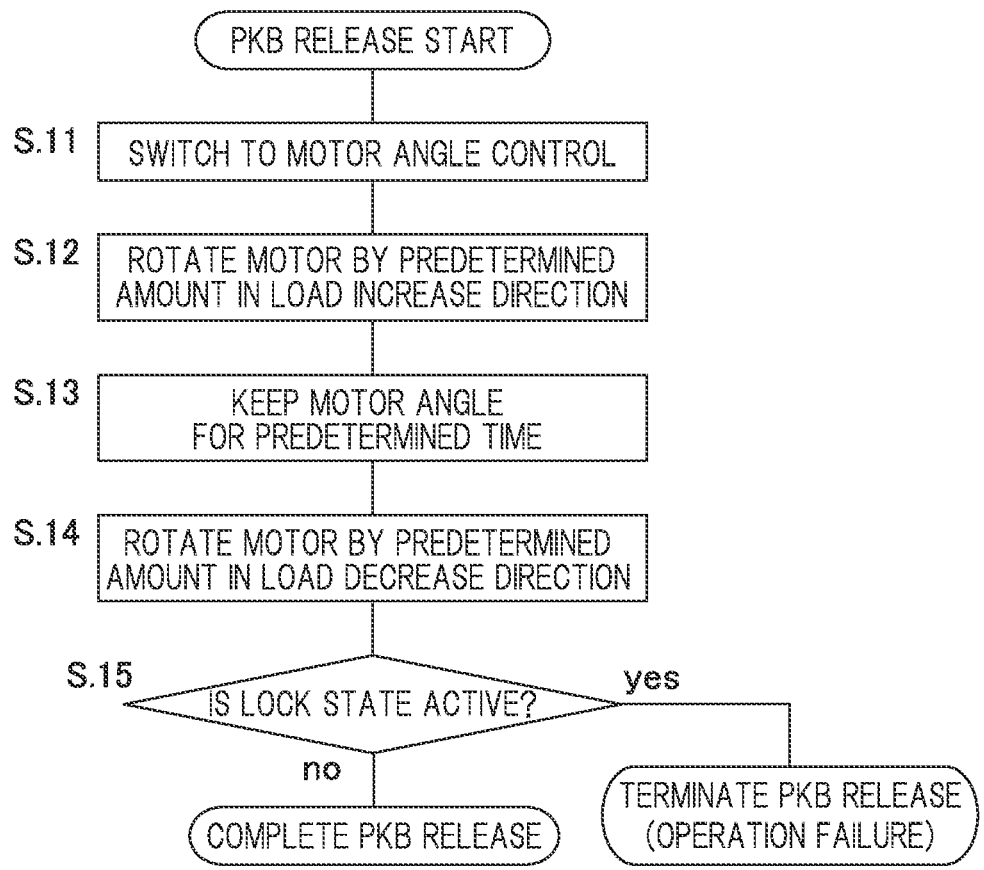
FIG. 6 is a flowchart illustrating an exemplary operation for releasing the parking brake mechanism.

FIG. 6 shows an example of releasing the parking brake mechanism from a reverse-input holding state in which the parking brake is set into operation according to FIG. 5. The control of FIG. 6 is also carried out by the reverse-input holding control section 24 (FIG. 4) and the actuator control module 23 (FIG. 4). As shown in FIG. 4 and FIG. 6, a condition for starting unlocking (releasing) the parking brake mechanism PBK may be, for example, when the parking brake switch is operated by an operator to turn off the parking brake mechanism.

As shown in FIG. 6 and FIG. 4, when the condition for starting unlocking the parking brake mechanism PBK is satisfied, the control switchover signal is given to cause a switchover to motor angle control by the motor angle control section 23b (step S11). Then, the electric motor 4 is rotated in an opposite direction to a direction of a reaction force torque due to a reverse input, i.e., a load increase direction (step S12), and the electric motor 4 is maintained in a rotated state in the load increase direction for a predetermined period of time (during a disengagement drive time) (step S13). A state before the switchover to the motor angle control (step S11) may be arbitrarily defined on the basis of an operation during the reverse-input holding state, design requirements, or the like.

The reverse-input holding control section 24 has a function of storing a rotation angle of the electric motor 4 in the reverse-input holding state. When the reverse-input holding state is to be released, the reverse-input holding control section 24 causes the electric motor 4 to rotate in the opposite direction to the direction of the reaction force torque due to the reverse input, from the stored rotation angle in the reverse-input holding state, by a motor angle which is set on the basis of the shapes of the engaging part 15 and the engaged part Hk, the motor angle being not zero and smaller than an engaged part gap angle by which the electric motor 4 is rotatable when the reverse-input holding mechanism is in engagement. Further, the reverse-input holding control section 24 maintains the electric motor 4 in a rotated state in which the electric motor 4 has been rotated in the opposite direction to the direction of the reaction force torque due to the reverse input by the motor angle being not zero and smaller than the engaged part gap angle for a disengagement drive time from a point at which the lock mechanism starts a driving operation until the engaging part 15 completes its motion. The disengagement drive time is set on the basis of a driving force and an inertia of the engaging part 15 during disengagement.

Specifically, in step S12, the electric motor 4 is rotated by a predetermined amount in the load increase direction. The predetermined amount may be at least larger than zero and be smaller than an angle (gap angle) θlk by which the engaging part 15 of the solenoid 16 in engagement is rotatable based on a gap between the engaged part Hk and the engaging part 15. In particular, the predetermined amount may preferably be set approximately from θlk·(1/4) to θlk·(3/4) within the range mentioned above.

In step S13, the motor angle is held at a substantially constant angle for a predetermined period of time in order to secure a time for the engaging portion 15 to disengage, with the electric motor 4 rotated by a predetermined amount. The substantially constant angle may be considered as constant, ignoring fluctuation so small as to have negligible influence on a parking brake release operation. For example, the predetermined period of time may be determined on the basis of a solenoid disengagement time calculated from a disengagement stroke amount of the solenoid, a mass of the engaging part 15 which is a movable part, a solenoid driving force, or the like. Preferably, the predetermined period of time may be set also in consideration of the influence of sliding resistance, temperature change, variation in the driving force due to individual difference, a predetermined safety factor, or the like. This operation may be implemented by angular speed control in which a motor angular speed command value is set to zero.

Then, the electric motor 4 is rotated by a predetermined amount in the load decrease direction (step S14), and it is determined whether the lock state has been released (step S15). The release of the lock state may be determined on the basis of, for example, the condition that the electric motor 4 has been rotated toward a load decrease side with respect to a position at which the lock was provided at the start of the flow or the fact that the electric motor 4 has been rotated toward the load decrease side by more than one pitch of the engaged part Hk.

Further, if it is determined that the electric motor 4 is locked (such as when the rotation of the electric motor 4 is hindered) before the previous condition is met (step S15: yes), it is determined that the parking brake release operation is unsuccessful. If it is determined that the lock state has been released (step S15: no), the release of the parking brake mechanism PBK is completed. This operation may be performed by angle control in which a motor angle command value is changed so as to decrease a load or by angular speed control with a predetermined motor angular speed command value for decreasing a load.

Although not illustrated in FIG. 6 showing the case of the solenoid in which the engaging part is caused to protrude by an attraction force of the solenoid coil and is separated by a spring reaction force, for example, in a solenoid or a DC motor which is bidirectionally driven in accordance with a direction of an electric current, it is necessary to include an operation of applying an electric current in a direction for separating the lock mechanism between step 12 and step S13, or before or after these steps.

An operation for the case where the respective operation failures shown in FIG. 5 and FIG. 6 occur may be set suitably to system requirements. For example, the operation may be to retry the process from a predetermined step in the flow, or to stop a related operation(s) of the parking brake mechanism as an operation failure, or to perform these in combination according to a condition such as the number of retries. As needed, it is possible to provide a unit for transmitting information of occurrence of operation failure to a driver of the vehicle, the higher order ECU, or the like.

In other respects, FIG. 5 and FIG. 6 show minimum operation flows for performing the parking brake operations. As long as the operation flows work, these operation flows may be modified as needed. For example, it is possible to additionally include a flow for the case where the parking brake operation is stopped in the middle or, for example, to additionally include a flow for detecting an inclination at a present location of the automobile and adjusting the parking brake load according to the inclination angle. Further, similar flows to those of FIG. 5 and FIG. 6 may also be applied to an electric valve device (FIG. 17) as described later or other applications such as an electric press device by making modification depending on the applications, such as by changing the brake load control to valve flow rate control or press load control.

Exemplary Operation of Electric Braking Device

Figure 7:
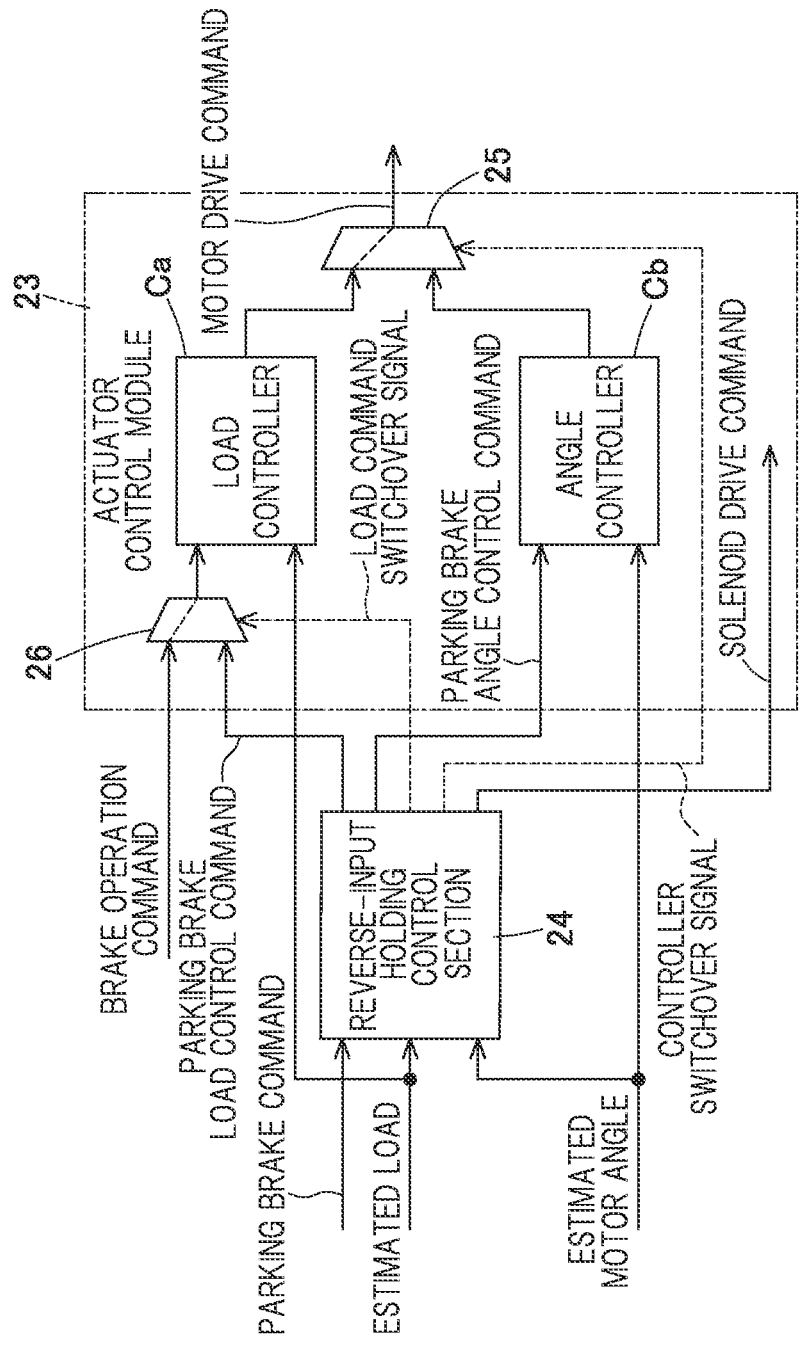
FIG. 7 is a block diagram illustrating an exemplary operation of a control device of the electric braking device.

FIG. 7 to FIG. 12 show exemplary configurations of parts of the reverse-input holding control section 24 and the actuator control module 23 as examples of FIG. 4. FIG. 7 shows an example of the actuator control module 23 including a load controller Ca and an angle controller Cb, in which the controllers are switched by the switch 25 on the basis of a switchover determination by the reverse-input holding control section 24, so that one of the controllers outputs a motor drive command (motor drive signal). It should be noted that the motor drive command may be, for example, any of a motor torque, a motor electric current, or a motor voltage. As a non-illustrated feature, a separate function is provided, such as a torque electric current converter, an electric current control module.

The load controller Ca has a control calculation function of controlling an estimated load such that the estimated load follows a target load value given by either a brake operation command or a parking brake load control command. For example, the brake operation command may be a brake command signal which varies according to an operation amount of the brake pedal or the like, or a control signal from a higher order ECU17 (FIG. 4) such as a brake command in an autonomous vehicle, or a control signal based on e.g. antiskid control, side slip prevention control, and emergency automatic braking. The load controller may further have a function of changing a calculation parameter such as a control gain in accordance with these applications.

The parking brake load control command may be set as a brake load command for a parking brake operation for applying a predetermined brake load. A switch 26 causes a switchover between the parking brake load control command and the brake operation command on the basis of a switchover determination by the reverse-input holding control section 24.

The angle controller Cb has a control calculation function of controlling an estimated motor angle such that the estimated motor angle follows a parking brake angle control command. It should be noted that the application of the angle controller Cb may not be limited to the parking brake application. For example, as a non-illustrated feature, where the angle controller has a clearance control function or the like in the time of brake release, the angle controller may have a function of controlling an estimated motor angle such that the estimated motor angle follows a motor angle command value for the clearance control and may further have a function of changing a calculation parameter such as a control gain in accordance with these applications.

The reverse-input holding control section 24 has a function of obtaining a control signal and a control switchover signal for executing the lock by the solenoid 16 (FIG. 4), with a predetermined brake load being applied, in accordance with a parking brake command by using at least the load controller Ca and the angle controller Cb.

A solenoid drive command may be, for example, a command signal for turning on and off electric current application to the solenoid coil in the solenoid which is separated by a spring reaction force. As one example of a specific configuration, circuits possibly employed in this specification may be constituted by a calculation element port (such as a microcomputer) for switching an electric potential with respect to a predetermined threshold (such as TTL) between "1 (high)"/"0 (low)," and a switch element driver or a switch element itself for switching an electric current application switch element (such as FET, bipolar transistor) to permit or interrupt electric current application to the solenoid coil in accordance with the high/low port signal.

Alternatively, for example, in a solenoid or a DC motor which is bidirectionally driven in accordance with a direction of an electric current, the solenoid drive command may be a command signal for switching a direction of electric current application and turning on and off electric current application for causing the respective operations in the process of protrusion, separation and stop (standstill) of the lock mechanism. As one example of a specific configuration, circuits possibly employed in this specification may be constituted by a bridge circuit including at least four electric current application switch elements or a port group (such as a microcomputer) for operating the respective switch elements of the bridge circuit in a predetermined pattern of electric current application and interruption, or a predetermined protocol communication port (such as SPI, SENT, PWM) or a bridge circuit control driver.

Figure 8:
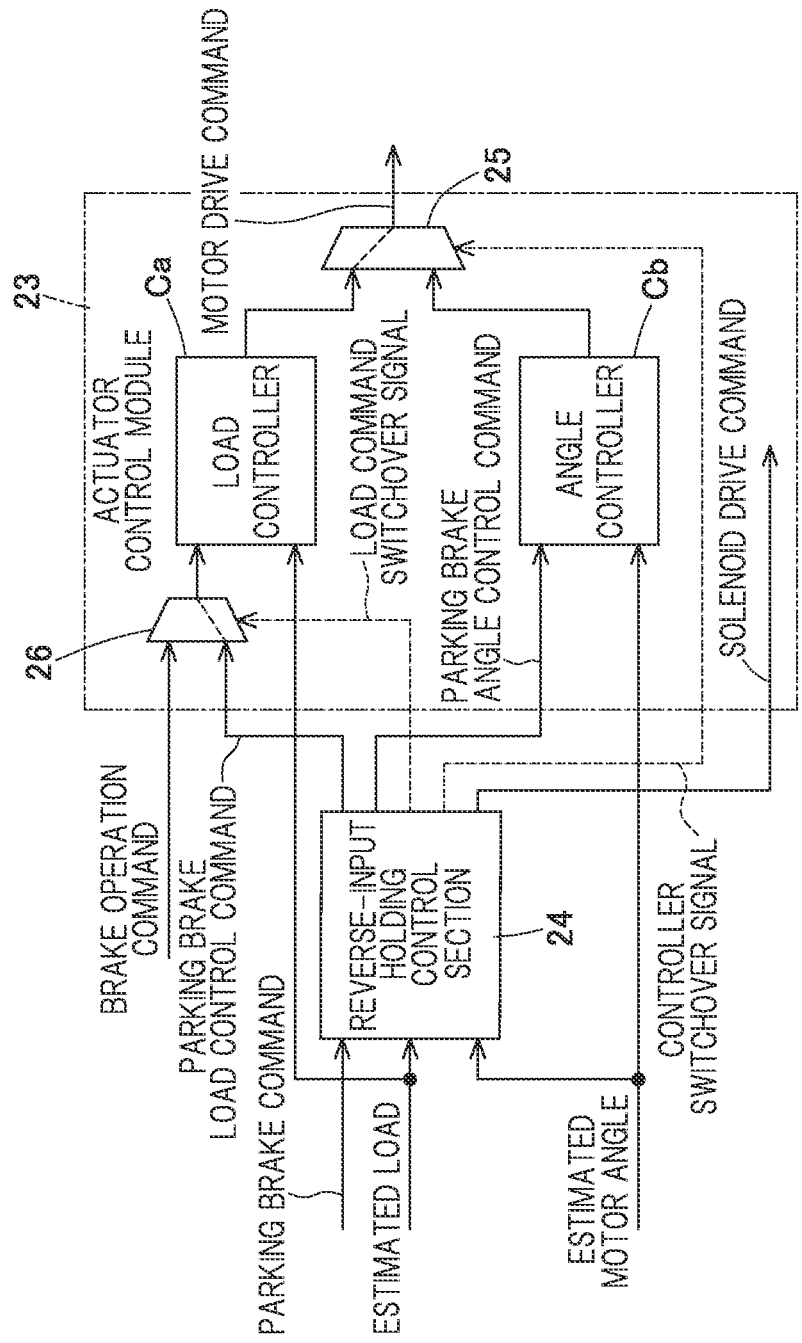
FIG. 8 is a block diagram illustrating an exemplary operation of the control device of the electric braking device.
Figure 9:
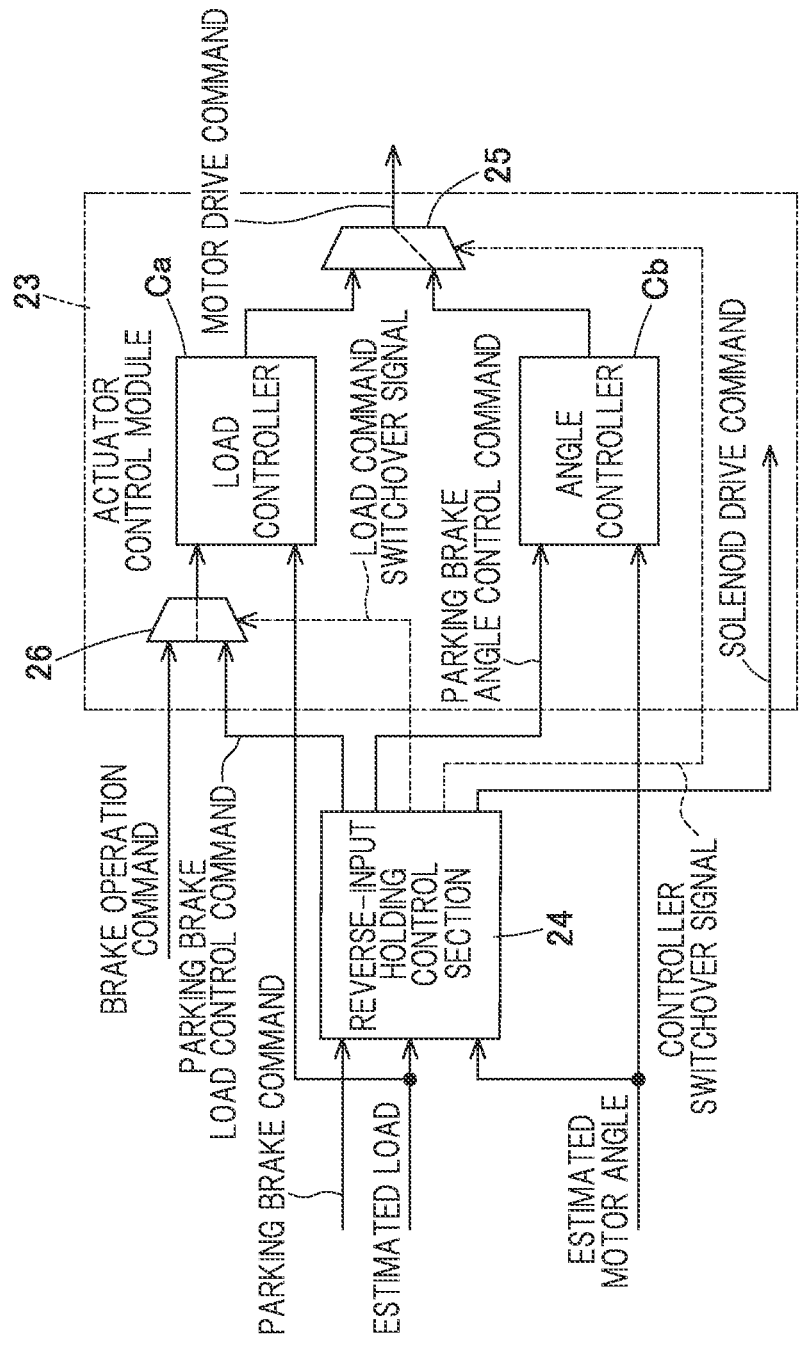
FIG. 9 is a block diagram illustrating an exemplary operation of the control device of the electric braking device.

FIG. 7, FIG. 8 and FIG. 9 show a same functional configuration in which the switches 25, 26 are switched to obtain mutually different control states. The switches 25, 26 are switched by the reverse-input holding control section 24. FIG. 7 shows an example of a normal brake control state, FIG. 8 shows an example of a brake load control state during a parking brake operation, and FIG. 9 shows an example of a motor angle control state during a parking brake operation.

Figure 10:
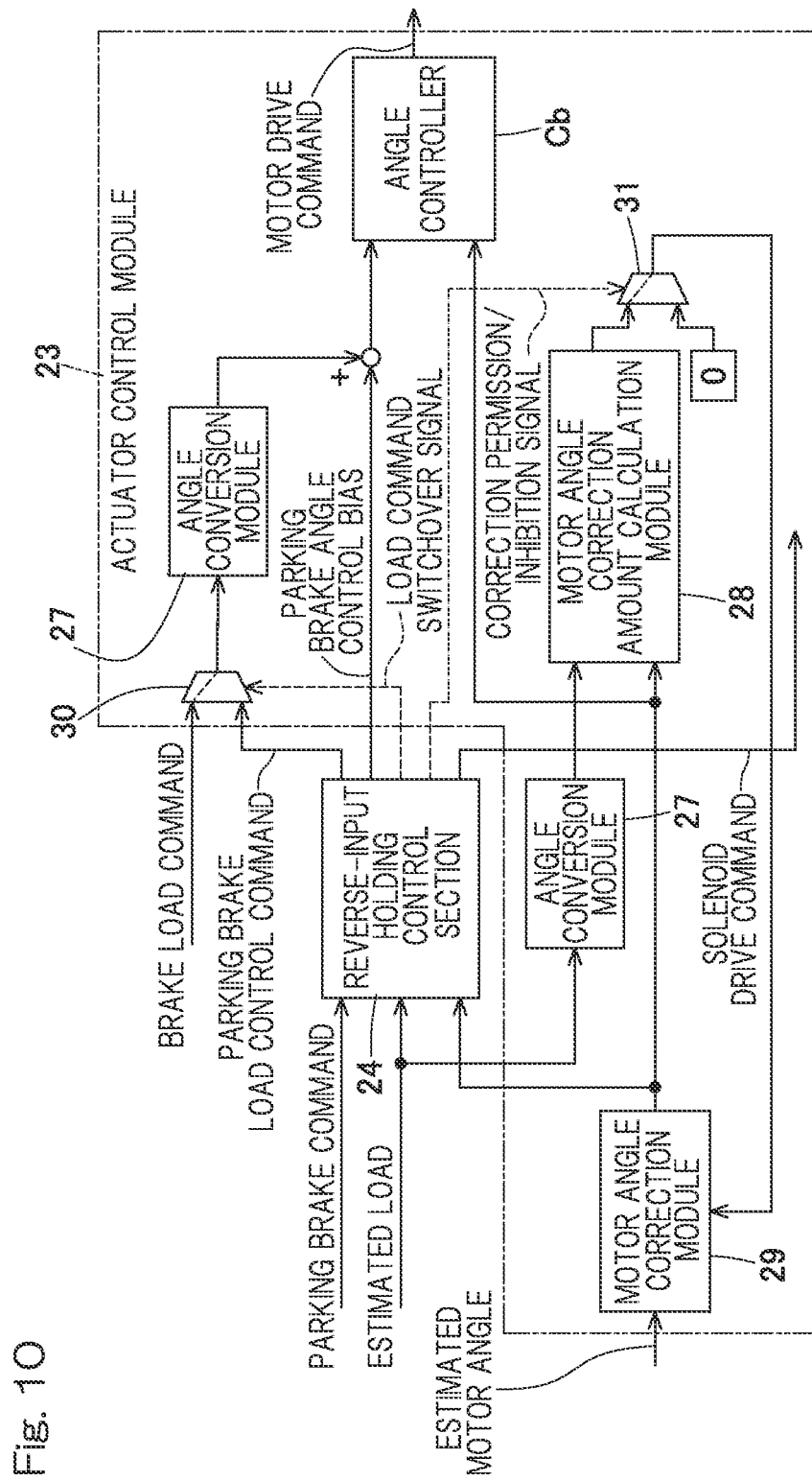
FIG. 10 is a block diagram illustrating an exemplary operation of the control device of the electric braking device.

FIG. 10 shows an example in which a brake load control function is implemented with a predetermined correlation between brake load and motor angle as well as the angle controller Cb without providing a load controller, as compared with the examples of FIG. 7 to FIG. 9.

As shown in FIG. 10, an angle conversion module 27 has a function of converting a brake load into a motor angle on the basis of a correlation which enables calculation of a motor angle for generating a predetermined brake load. For example, the correlation between brake load and motor angle may be based on a previously-measured rigidity of the electric braking device including the electric-powered actuator, or be developed as needed by data fitting, learning, or the like on the basis of a correlation between brake load and motor angle during operation, or be provided by using these techniques in combination.

A motor angle correction amount calculation module 28 compares a motor angle calculated from an estimated load via the angle conversion module 27 to a corrected motor angle by a motor angle correction module 29 which will be described later and derives a motor angle correction amount for substantially eliminating a difference between these angles.

The motor angle correction module 29 corrects a present estimated motor angle to a motor angle at which a brake load deviation can be brought to substantially zero on the basis of the motor angle correction amount calculated by the motor angle correction amount calculation module 28. That is, the estimated motor angle is corrected so as to remove a difference between the correlation between brake load and motor angle in the angle conversion module 27 and an actual correlation between them, and the corrected motor angle is controlled in a follow-up manner by the angle controller Cb, so that the follow-up control of the brake load can thus be achieved. Further, configuring the motor angle correction amount calculation module 28 so as not to operate (i.e. a multiplier 31 shown subsequently to the motor angle correction amount calculation module 28 in FIG. 10 is connected to "0") is equivalent to executing the follow-up control of the motor angle in the examples of FIG. 7 to FIG. 9.

Figure 11:
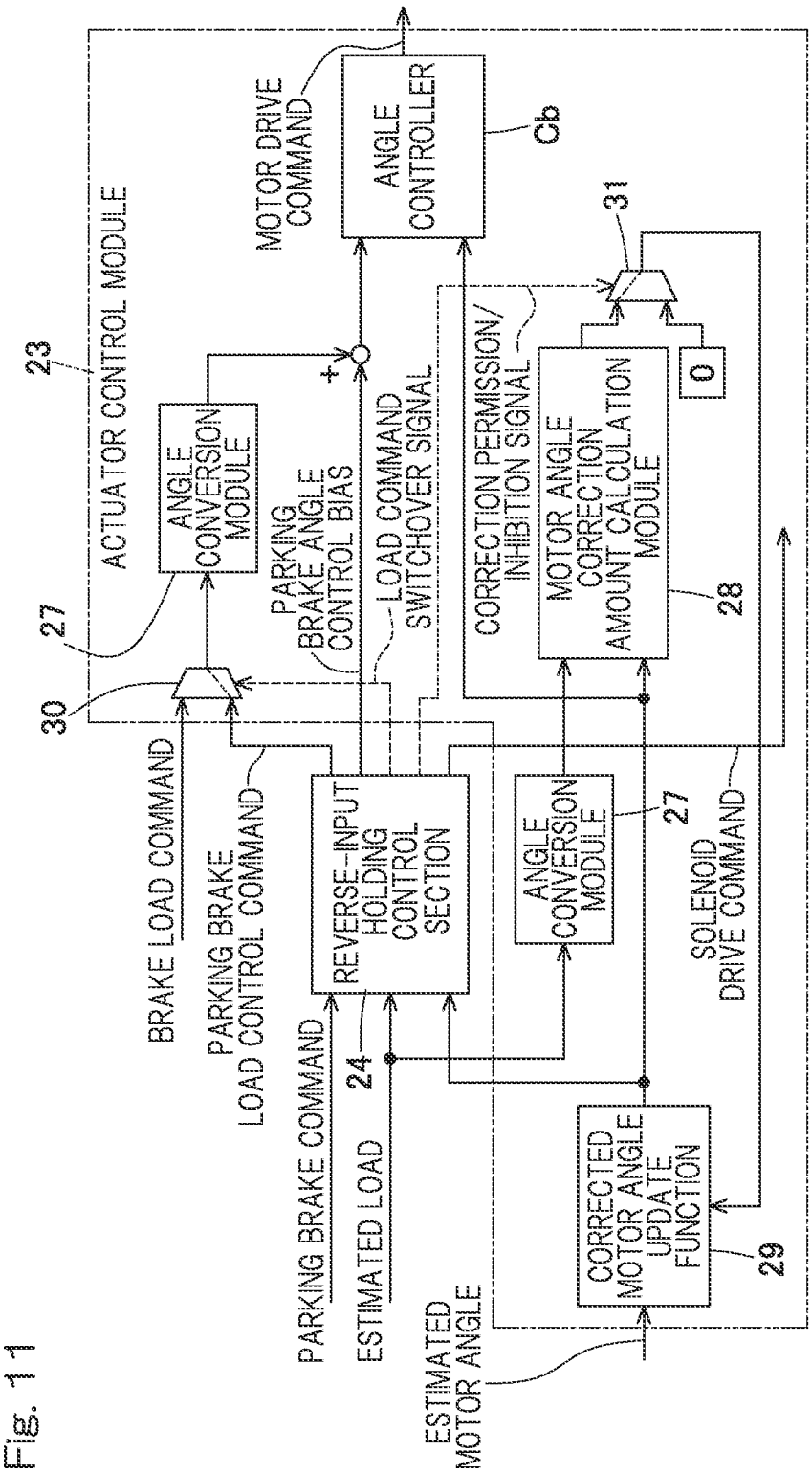
FIG. 11 is a block diagram illustrating an exemplary operation of the control device of the electric braking device.
Figure 12:
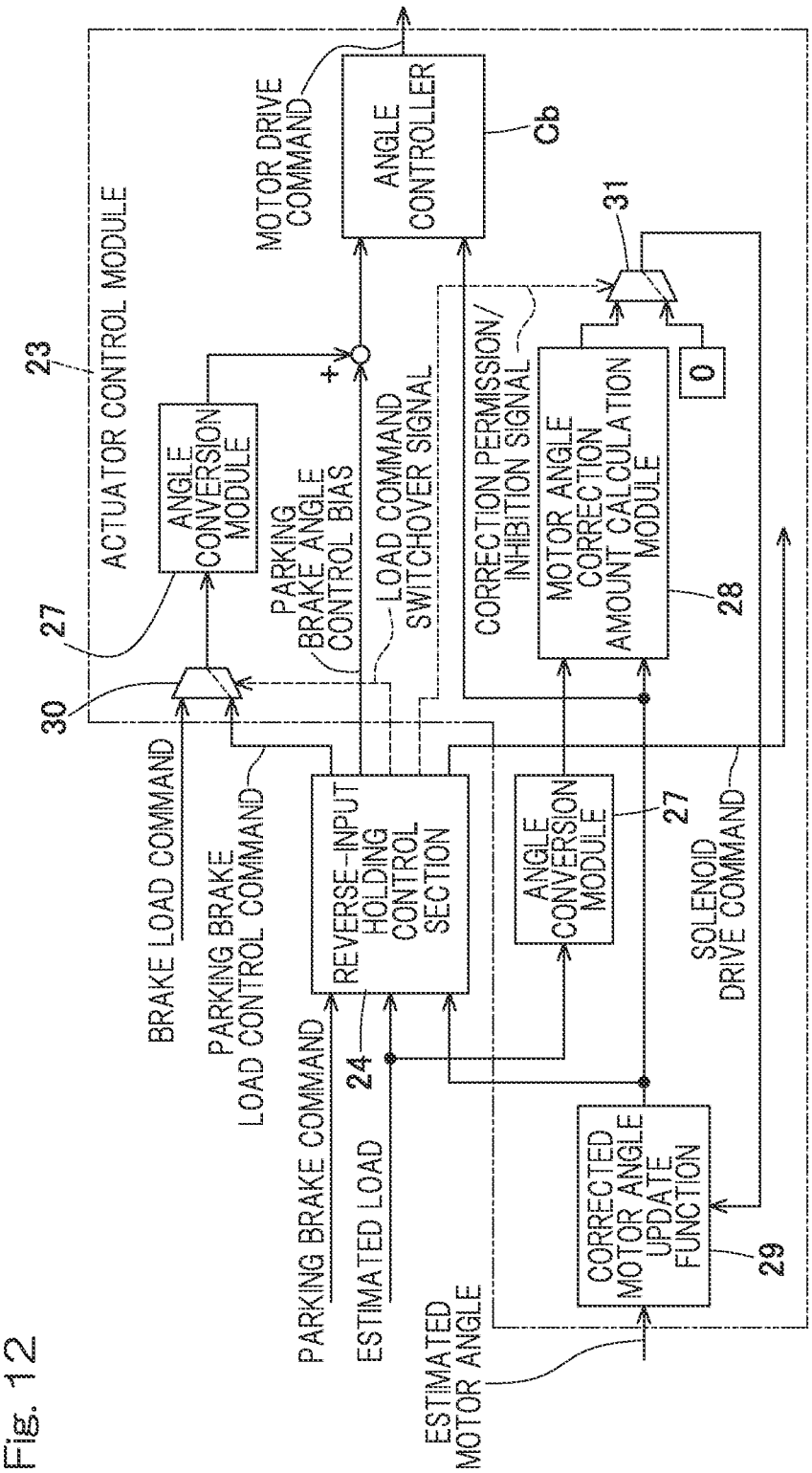
FIG. 12 is a block diagram illustrating an exemplary operation of the control device of the electric braking device.

FIG. 10, FIG. 11 and FIG. 12 show a same functional configuration in which the switches 30, 31 are switched to obtain mutually different control states. The switches 30, 31 are switched by the reverse-input holding control section 24. FIG. 10 shows an example of a normal brake load control state, FIG. 11 shows an example of a brake load control state during a parking brake operation, and FIG. 12 shows an example of a motor angle control state during a parking brake operation.

FIG. 7 to FIG. 12 only show the concepts of the functional configuration, and non-illustrated features may be provided suitably to requirements. In addition, the respective functional blocks are provided only for the sake of convenience and may be suitably combined or divided in a configuration using hardware or software for convenience of implementation.

Figure 17:
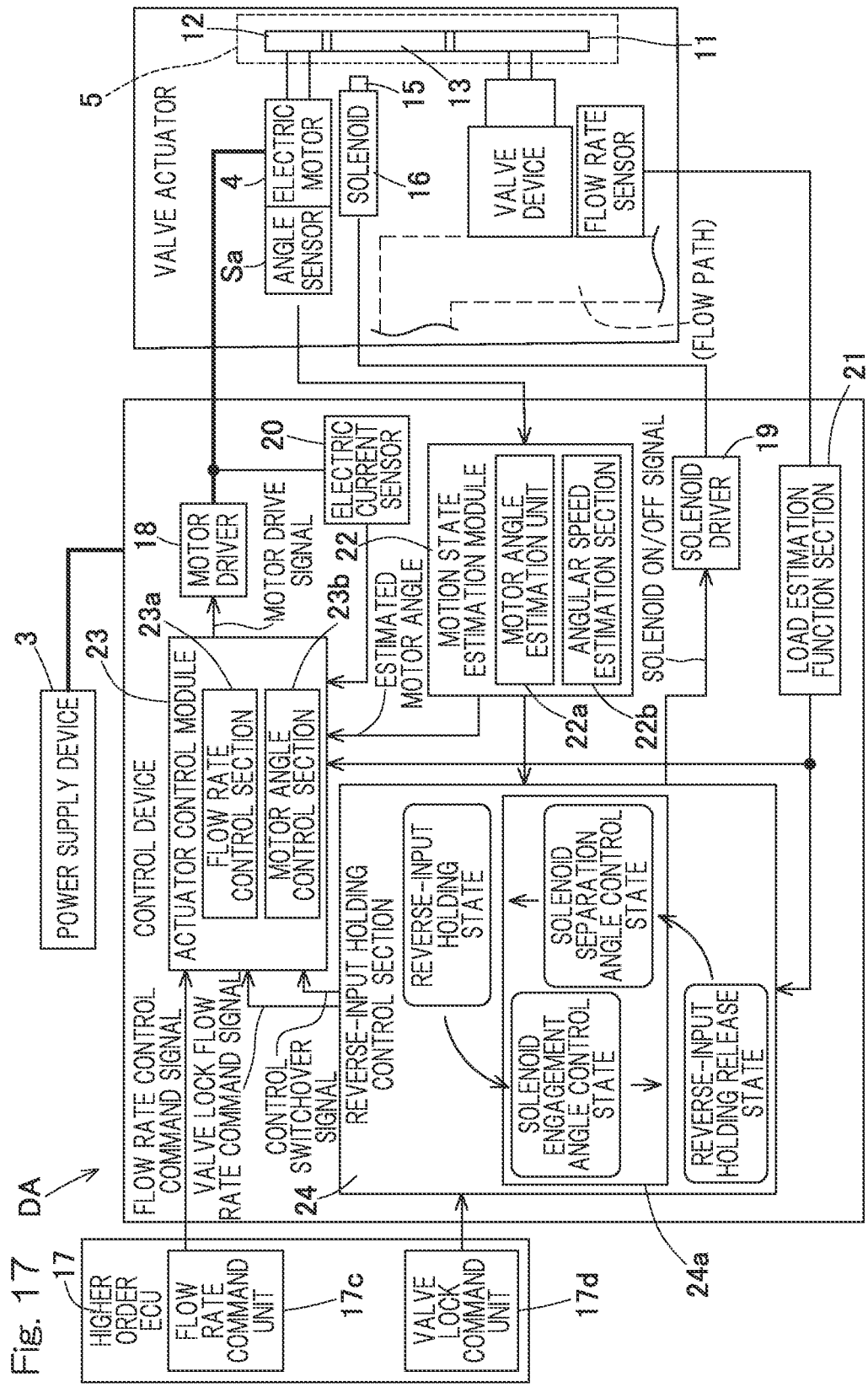
FIG. 17 is a block diagram of a control system of an electric-powered actuator according to a yet further embodiment of the present invention.

The block diagrams of FIG. 7 to FIG. 12 merely illustrate flow of functional signals and do not define orders of calculations or timings upon implementation. As long as the functions are not impaired, the orders of calculations may be arbitrarily adapted, and the timings may be suitably adapted, for example, by introducing multi-rate processing for performing the calculations at a plurality of sampling rates such that the calculations are performed at high speed or low speed depending on the functions. As long as there is no contradiction upon implementation, the examples of the present embodiment may not necessarily be implemented singly and may be partly or entirely combined as needed. Although FIG. 7 to FIG. 12 show examples in relation to the parking brake mechanism, similar configurations to those of FIG. 7 to FIG. 12 may be applied to the electric valve device as shown in FIG. 17 and other applications such as an electric press device by making modification depending on the applications.

Exemplary Operation of Parking Brake Mechanism

Figure 13:
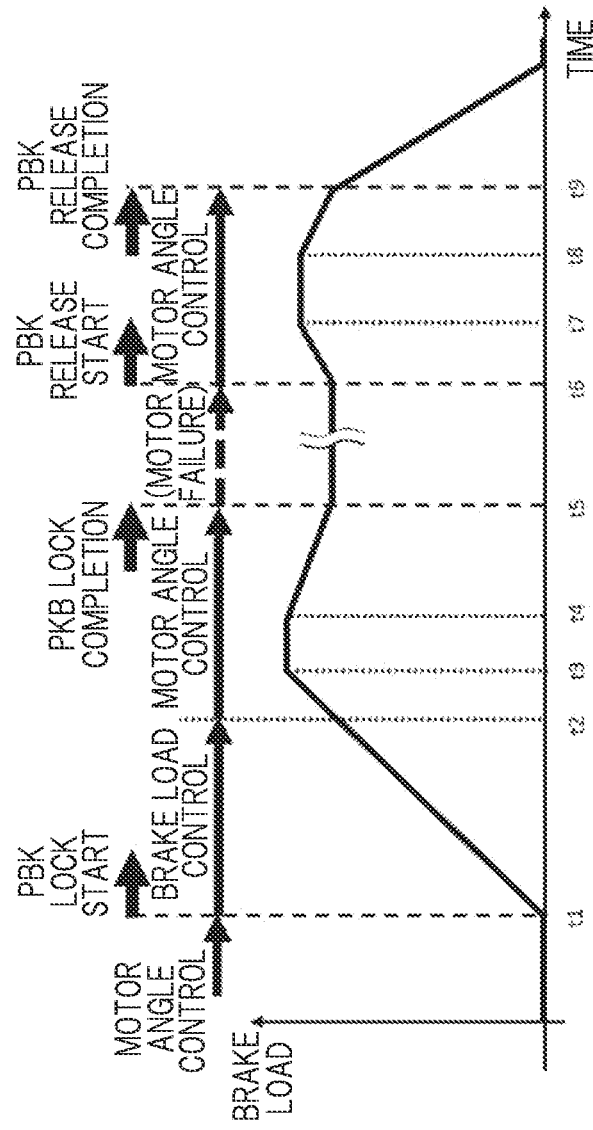
FIG. 13 illustrates an exemplary operation of the parking brake mechanism.

FIG. 13 and FIG. 14 show exemplary operations of the parking brake mechanism of FIG. 1 to FIG. 12. FIG. 13 shows an example of starting parking a brake operation while the brake is released, that is, starting the operation from a state where the clearance control is being executed by the motor angle control. When a lock operation of the parking brake mechanism is started at time t1, the brake load control is executed to increase the brake load to a predetermined parking brake load.

Once the predetermined parking brake load is reached at time t2, a switchover to the motor angle control is executed, and the load is further increased by a predetermined amount. This operation is performed, for example, because the brake load may possibly be reduced by one pitch of the holes of the engaged part (FIG. 3) in the process of the reverse-input holding mechanism executing the lock and because the reduction amount of the brake load depends on the hole pitch, i.e., the motor angle. In this regard, for example, the process may be performed in such a way that, while continuing the brake load control at time t2, the load is increased to a predetermined brake load which is obtained by adding, to the predetermined parking brake load, a previously defined brake load amount corresponding to a possible reduction of the brake load by the hole pitch, and then a switchover to the motor angle control is executed.

Once the load increase by the predetermined amount is completed at time t3, the motor angle is maintained substantially constantly until time t4. At the same time, an operation of causing the engaging part of the solenoid to protrude is performed. From time t4, with the engaging part of the solenoid maintained in a protruded state, the electric motor is rotated in the load decrease direction. When the engaged part and the engaging part of the solenoid come into predetermined positions at which they are brought into engagement, the engaged part is locked by the solenoid, and the rotation of the motor is stopped (time t5). Thus, the lock operation of the parking brake mechanism is completed. FIG. 13 shows a process for causing the electric motor to fail or stop (for bringing the engaging part into engagement with the engaged part without using a torque of the electric motor) upon completion of the lock. However, for example, the electric motor may be kept on standby in a predetermined power saving mode with zero torque or with zero electric current.

At time t6, an unlock (release) operation of the parking brake mechanism is started. A switchover to the motor angle control is executed, and the electric motor is rotated by a predetermined amount toward the load increase side. Although not illustrated in FIG. 13 in order to show a solenoid in which the engaging part is caused to protrude by an attraction force of the solenoid coil and to be separated by a spring reaction force, for example, in a solenoid or a DC motor which is bidirectionally driven in accordance with a direction of an electric current, an operation is executed at time t6 or t7 to apply an electric current in a such direction that the lock mechanism is caused to be separated.

From time t7, the electric motor angle is maintained substantially constantly until the engaging part of the solenoid is surely separated. Then, from time t8, the electric motor is rotated in the load decrease direction. At time t9, it is determined that the lock has been released because the electric motor has been rotated in the load decrease direction at least from a motor angle at which the lock state was attained, and the release operation of the parking brake mechanism is completed. It should be noted that the operation after time t9 may be arbitrarily set.

FIG. 14 shows an example of executing an operation of the parking brake mechanism from a brake load control state. It should be noted that FIG. 13 and FIG. 14 show operations based on an assumption that the relative positions of the engaged part and the engaging part of the solenoid are unknown at the time of starting a lock operation of the parking brake mechanism. However, where a positional relation of the engaged part can be determined in advance, such as where the engaged part is provided to a motor shaft, the electric motor may be stopped in advance at an angle at which the engaged part and the engaging part of the solenoid are in an engageable positional relation, and then, the engaging part of the solenoid may be caused to protrude.

Effects and Advantages

According to the above-described electric-powered actuator DA and electric braking device 1, the engagement intermediate control function section 24a keeps the engaged part Hk and the engaging part 15 in such a positional relation that they do not come into contact with each other for a certain period of time necessary for the operation of the engaging part 15 when the engaging part 15 is brought into or out of the engagement with the engaged part Hk which synchronously moves with the rotor of the electric motor 4. In other words, the engagement intermediate control function section 24a controls the rotation angle of the electric motor 4 in accordance with the operation of the engaging part 15 to maintain the engaging part 15 in an engagement intermediate state with respect to the engaged part Hk. Thus, by the subsequent rotation of the electric motor 4, the engaging part 15 can be reliably brought into or out of the engagement with the engaged part Hk such that a transition is more reliably made to the reverse-input holding state or the reverse-input holding release state. Thanks to such a control, the reverse-input holding mechanism can be reliably operated, so that cost savings can be achieved, as compared with the conventional technologies including complicated structures and the like as mentioned above.

Other Embodiments

Next, other embodiments will be described. In the following description, the same reference numerals are used to denote parts that correspond to those previously described in the respective embodiments, and overlapping description is omitted. Where only a part of a configuration is described, the rest of the configuration is to be construed as being the same as the previously described embodiments unless otherwise indicated. The same configurations provide the same effects. It is possible not only to combine the parts that have been particularly described in the respective embodiments but also to partly combine the embodiments unless there is any hindrance to such a combination.

Other Exemplary Configuration of Reverse-Input Holding Mechanism

Figure 15A:
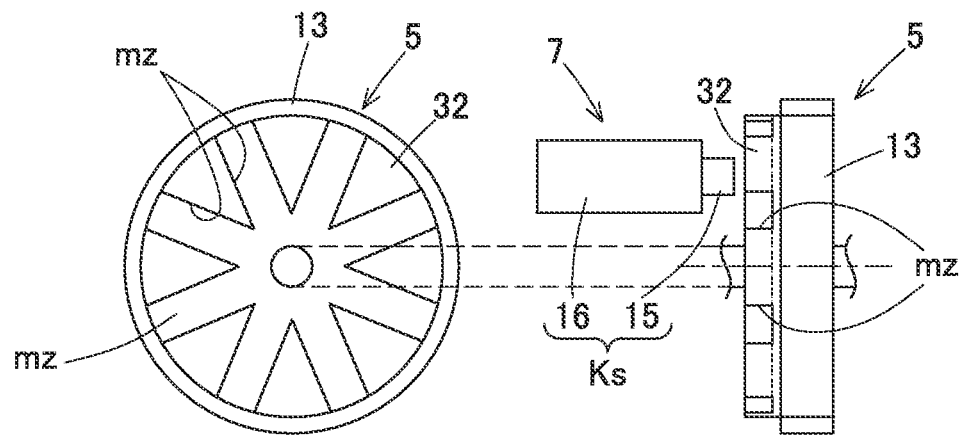
FIG. 15A shows an exemplary configuration of a reverse-input holding mechanism of an electric-powered actuator according to another embodiment of the present invention.

FIG. 15A shows an example in which an engaging member 32 (engaged part) which synchronously rotates with a rotation shaft of the middle gear 13 of the speed reducer 5 is additionally included in the direction of the rotation axis, and the engaging member 32 is formed with radial grooves mz. The grooves mz have contact surfaces parallel to a direction of linear motion of the engaging part 15 with respect to both rotation directions of the electric motor. for example, the additional engaging member 32 may have a shaft fitting shape formed by plane machining or spline cutting so as to synchronously rotate with the gear and may be joined with the gear part by welding, bonding, or the like.

Figure 15B:
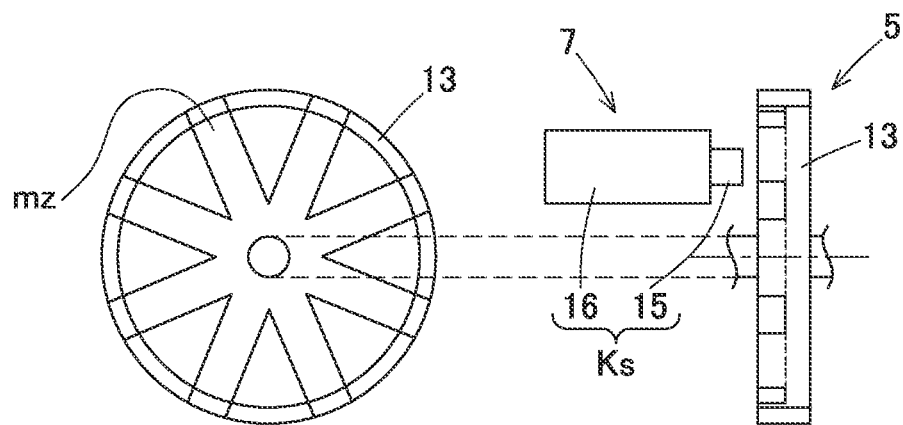
FIG. 15B shows an exemplary configuration of a reverse-input holding mechanism of an electric-powered actuator according to still another embodiment of the present invention.

As with the case of FIG. 2, in the example of FIG. 15A, the engaging part 15 of the solenoid 16 comes into engagement with the grooves mz, so that the rotation of the electric motor is prevented, and the engagement is held by a friction force of the contact surfaces against a reverse input without using a torque of the electric motor. FIG. 15B shows an example in which the radial grooves mz are directly formed on the gear 13. In this case, the structure can be simplified as compared to the example of FIG. 15A, so that cost savings can be achieved.

Figure 16A:
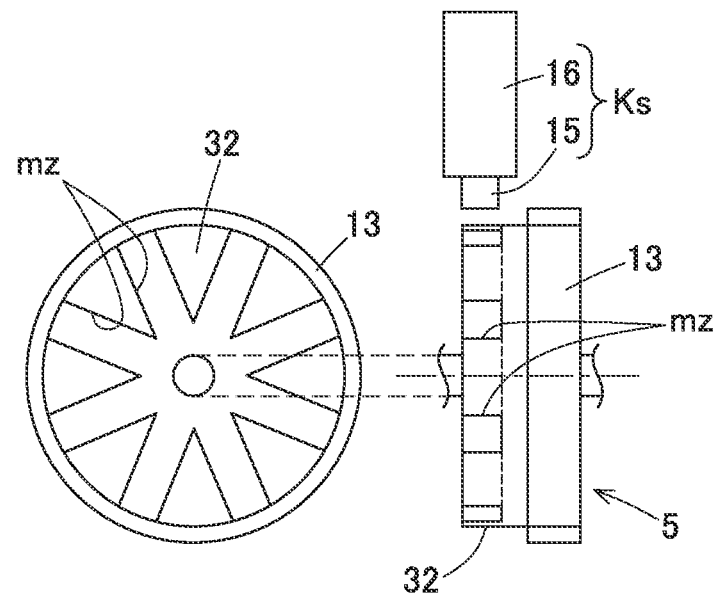
FIG. 16A shows an exemplary configuration of a reverse-input holding mechanism of an electric-powered actuator according to yet another embodiment of the present invention.
Figure 16B:
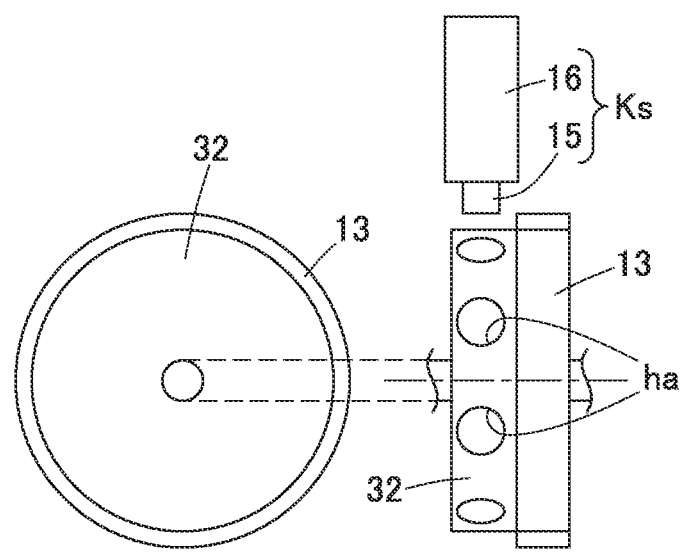
FIG. 16B shows an exemplary configuration of a reverse-input holding mechanism of an electric-powered actuator according to a further embodiment of the present invention.
Figure 16C:
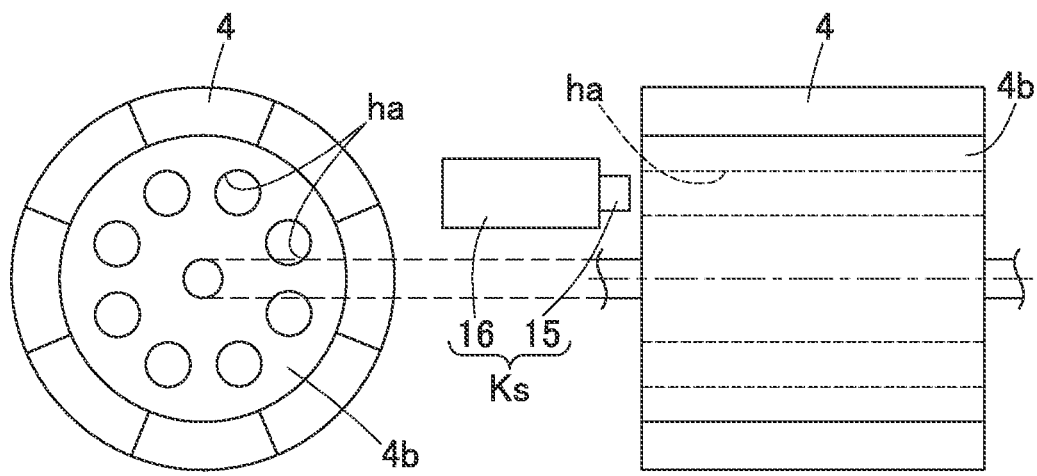
FIG. 16C shows an exemplary configuration of a reverse-input holding mechanism of an electric-powered actuator according to a still further embodiment of the present invention.

As another example, FIG. 16A shows an example in which the solenoid 16 is disposed so as to face an outer peripheral surface of the engaging member 32 serving as an engaged part from radially outside. In this case, the engaging part 15 of the solenoid 16 linearly moves in a radial direction perpendicular to the axial direction of the engaged part. FIG. 16B shows an example in which a plurality of holes ha are circumferentially provided at equal intervals on the outer peripheral surface of the engaging member 32 serving as an engaged part, instead of the grooves as in the example of FIG. 16A. FIG. 16C shows an example in which holes ha as shown in FIG. 2 are directly provided in the rotor 4b of the electric motor 4.

In other respects, the configurations of FIG. 2 and FIG. 15A to FIG. 16C may be suitably combined as long as such a combination of the shapes is possible. For example, the shape as shown in FIG. 15A, FIG. 15B, FIG. 16A, or FIG. 16B may be applied to the rotor of the electric motor of FIG. 16C. Further, although FIG. 2 and FIG. 15A to FIG. 16C show examples in which a solenoid is used as a drive source, for example, it may be a linear motion structure constituted by a DC motor and a spring or the like. Alternatively, instead of arranging the engaged part and the solenoid so as to directly face each other, an additional link mechanism or the like may be provided.

FIG. 17 show an example of an electric valve device having a function of locking a flow rate control valve in a predetermined state, as a further instance of applying the electric-powered actuator to an application other than the electric braking device. The example of FIG. 17 differs from the electric braking device 1 (FIG. 4) in that the linear motion mechanism is changed to a valve device (such as a butterfly valve), and a function relating to load control is changed to a function relating to flow rate control. Further, a flow rate command unit 17c is included instead of the brake command unit 17a (FIG. 4), and a valve lock command unit 17d is included instead of the parking brake command unit 17b (FIG. 4).

The motor angle control section 23b of FIG. 17 may include a feature which can substantially provide an angle control function. An example of such a feature may be angle control of a predetermined speed reducer gear which synchronously rotates with the electric motor 4 or position control through a linear motion structure such as screw leads. Alternatively, depending on the condition, angular speed control can be employed. For example, it is possible to substitute position control for keeping a predetermined position with angular speed control for maintaining the speed at zero, and to substitute position control for changing an angle according to a predetermined condition with angular speed control with a predetermined value. Alternatively, as long as there is no hinderance, these techniques may be combined as needed.

In other respects, the functional blocks as shown in FIG. 4 and FIG. 17 are provided only for the sake of convenience and are not intended to limit configurations or partitions of hardware and software, or the like. The specific configurations of hardware and software may be arbitrarily set up as long as the functions as shown in FIG. 4 and FIG. 17 are not impaired, and the functions of the respective blocks in these figures may be combined or divided as needed. Alternatively, a non-illustrated element may be added as long as the functions as shown in these figures are not impaired. For example, it is possible to suitably include additional control such as anti-skid control of the electric braking device, pad clearance control during brake release, and side slip prevention control and other safety mechanisms, depending on system requirements.

As the electric motor 4, for example, it is possible to use a DC motor with brushes, a reluctance motor without a permanent magnet, an induction motor, or the like. As the speed reducer 5, for example, it is possible to use planetary gears, worm gears, harmonic speed reducers, or the like. As the linear motion mechanism 6, for example, it is possible to use various mechanisms for converting rotary motion into linear motion by inclination in a circumferential direction of a rotation shaft, such as various screw mechanisms (e.g., planetary roller screws and ball screws), ball lamps, or the like.

Although the present invention has been described in terms of the preferred embodiments thereof with reference to the drawings, various additions, modifications, or deletions may be made without departing from the scope of the invention. Accordingly, such variants are included within the scope of the present invention.

REFERENCE NUMERALS

1 . . . electric braking device
2 . . . control device
4 . . . electric motor
7 . . . parking brake mechanism (reverse-input holding mechanism)
8 . . . brake rotor
9 . . . friction member
15 . . . engaging part
16 . . . actuator (drive source)
21 . . . load estimation mechanism section
22a . . . motor angle estimation unit
23a . . . brake load control section (load control function section)
23b . . . motor angle control section
24 . . . reverse-input holding control section
24a . . . engagement intermediate control function section
Ks . . . lock mechanism
DA . . . electric-powered actuator
Hk . . . engaged part

What is claimed is:
1. An electric-powered actuator comprising:
an electric motor including a rotor and a stator; and
a control device configured to drive and control the electric motor,
the electric-powered actuator further comprising:
　an engaged part configured to synchronously move with the rotor;
　a lock mechanism including a drive source configured to drive an engaging part such that the engaging part is allowed to be engaged with and be disengaged from the engaged part; and
　a reverse-input holding mechanism configured to prevent rotation of the electric motor by engagement of the engaging part with the engaged part to hold a load generated by the electric-powered actuator without using a torque of the electric motor,
wherein the control device includes:
　a motor angle estimation unit configured to estimate a rotation angle of the electric motor; and
　a reverse-input holding control section having a function of engaging the engaging part with the engaged part by controlling the drive source to set the reverse-input holding mechanism into a reverse-input holding state while the electric-powered actuator is applying a load and a function of, from the reverse-input holding state, disengaging the engaging part from the engaged part to set the reverse-input holding mechanism into a reverse-input holding release state,
　a motor angle control section configured to control an estimated motor angle, which is the rotation angle to be estimated, such that the estimated motor angle follows a target motor angle;
　a load estimation function section configured to estimate a load to be applied by the electric-powered actuator on an external element; and
　a load control function section configured to control an estimated load which is estimated by the load estimation function section such that the estimated load follows a target load, and
the reverse-input holding control section includes
　an engagement intermediate control function section configured to control the estimated rotation angle such that the engaged part and the engaging part come into a predetermined positional relation within a certain period of time, in either or both of when the engaging part is brought into engagement with the engaged part and when the engaging part is brought out of engagement with the engaged part,
wherein the control device is configured to execute the load control function section until at least the electric-powered actuator generates a predetermined load when the reverse-input holding control section sets the reverse-input holding mechanism into the reverse-input holding release state, and to cause a switchover to the motor angle control section when the engagement intermediate control function section is to be executed,
wherein the reverse-input holding control section has a function of storing a rotation angle of the electric motor in the reverse-input holding state and is configured to, when the reverse-input holding state is to be released, rotate the electric motor in a direction opposite to the direction of the reaction force torque due to the reverse input, from the stored rotation angle in the reverse-input holding state by a motor angle which is set on the basis of shapes of the engaging part and the engaged part, the motor angle being not zero and smaller than an engaged part gap angle by which the electric motor is allowed to rotate with the reverse-input holding mechanism put in engagement, and to maintain the electric motor in a state where the electric motor has been rotated in the direction opposite to the direction of the reaction force torque due to the reverse input by the motor angle which is not zero and smaller than the engaged part gap angle during a disengagement drive time from a point at which the engaging part starts a disengaging operation from the engaged part until the engaging part completes the disengaging operation, the disengagement drive time being set on the basis of a driving force of the drive source and an inertia of the engaging part acting on the engaging part during disengagement.

2. The electric-powered actuator as claimed in claim 1, wherein the reverse-input holding control section has a function of, when the engaging part is brought into engagement with the engaged part in transition from the reverse-input holding release state to the reverse-input holding state, gradually rotating the electric motor in a direction corresponding to a direction of a reaction force torque due to the reverse-input, from a rotation angle of the electric motor when the electric-powered actuator is set to a state for generating a predetermined load according to a target load in the reverse-input holding state, and the reverse-input holding control section is configured to, on the basis of an engagement drive time from a point at which the engaging part starts an engaging operation with the engaged part until the engaging part completes the engaging operation, the engagement drive time being set on the basis of a driving force of the drive source and an inertia of the engaging part acting on the engaging part during engagement, and an engaged part gap angle by which the electric motor is allowed to rotate with the reverse-input holding mechanism put in engagement, the engaged part gap angle being set on the basis of a gap between the engaged part and the engaging part when the engaging part is in engagement with the engaged part, gradually rotate the electric motor in the direction corresponding to the direction of the reaction force torque due to the reverse-input by an angular shift amount of the electric motor, the angular shift amount being set such that an angular shift of the electric motor within the engagement drive time is smaller than the engaged part gap angle.

3. The electric-powered actuator as claimed in claim 1, wherein in the control device, the load control function section has a function of calculating a load control target motor angle, which is a motor angle used as a load control target, from the target load on the basis of a relation between the estimated load and the rotation angle to be estimated, correcting, under a predetermined estimated load, one or both of a load control target motor angle and an actual estimated motor angle on the basis of a load difference between the load control target motor angle calculated from the predetermined estimated load on the basis of the relation and the actual estimated motor angle under the predetermined estimated load, and performing follow-up control of the motor angle based on a correction result, and an operation of causing a switchover to the motor angle control section when the engagement intermediate control function section is to be executed is an operation of stopping correction of the motor angle based on the load difference.

4. The electric-powered actuator as claimed in claim 3, wherein the control device is configured to, when the engagement intermediate control function section controls the estimated motor angle such that the engaged part and the engaging part are brought into a predetermined positional relation within a certain period of time, execute the motor angle control section by using, as a target motor angle, a motor angle calculated from the estimated motor angle immediately before a switchover to the motor angle control section and from a predetermined motor angle adjustment bias.

5. The electric-powered actuator as claimed in claim 1, wherein in the reverse-input holding mechanism, the engaging part of the lock mechanism is a movable part configured to linearly move with respect to the engaged part, and the engaged part is formed with holes or grooves having contact surfaces parallel to a direction of linear motion of the engaging part with respect to both rotation directions of the electric motor.

6. An electric braking device comprising:

a brake rotor;

a friction member configured to come into contact with the brake rotor to generate a braking force; and the electric-powered actuator as claimed in claim 1, the electric-powered actuator being configured to generate a pressure load to control the braking force when the friction member is operated to come into contact with the brake rotor, wherein the reverse-input holding mechanism serves as a parking brake mechanism configured to hold a contact load between the brake rotor and the friction member with a predetermined pressure load without using a torque of the electric motor.

\* \* \* \* \*